(12) United States Patent
Xu et al.

(10) Patent No.: US 12,720,626 B2
(45) Date of Patent: Aug. 25, 2026

(54) MULTICAST TRANSMISSION METHOD AND RELATED APPARATUS

(71) Applicant: Huawei Technologies Co., Ltd., Shenzhen (CN)

(72) Inventors: Bin Xu, Beijing (CN); Bingzhao Li, Beijing (CN); Haifeng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 795 days.

(21) Appl. No.: 17/937,119

(22) Filed: Sep. 30, 2022

(65) Prior Publication Data

US 2023/0042357 A1 Feb. 9, 2023

Related U.S. Application Data

(63) Continuation of application No. PCT/CN2020/083923, filed on Apr. 9, 2020.

(51) Int. Cl.
*H04W 76/15* (2018.01)
*H04L 1/1607* (2023.01)
*H04W 4/06* (2009.01)

(52) U.S. Cl.
CPC ........... *H04W 76/15* (2018.02); *H04L 1/1642* (2013.01); *H04W 4/06* (2013.01)

(58) Field of Classification Search
CPC ....... H04W 76/15; H04W 4/06; H04W 80/02; H04L 1/15; H04L 1/08; H04L 1/1642; H04L 47/34
See application file for complete search history.

(56) References Cited

U.S. PATENT DOCUMENTS

2010/0165937 A1* 7/2010 Yi et al. ................ H04W 76/32
2011/0078528 A1 3/2011 Ohtaki
(Continued)

FOREIGN PATENT DOCUMENTS

CN 107786493 A 3/2018
JP 2019080244 A 5/2019
(Continued)

OTHER PUBLICATIONS

"3rd Generation Partnership Project; Technical Specification Group Radio Access Network; NR; Packet Data Convergence Protocol (PDCP) specification (Release 16)", 3GPP TS 38.323 V16.0.0, Technical Specification, Mar. 2020, 37 Pages.
(Continued)

*Primary Examiner* — Tonia L Dollinger
(74) *Attorney, Agent, or Firm* — Slater Matsil, LLP

(57) ABSTRACT

This application discloses a multicast transmission method. The multicast transmission method includes: a first network device receives a first data packet and first indication information, where the first indication information indicates a sequence of the first data packet in at least one data packet; the first network device sets a sequence number of a first protocol layer of the first data packet based on the first indication information; and the first network device sends the first data packet to a terminal device. In this way, all data packets received by the terminal device include corresponding sequence numbers of the first protocol layers.

21 Claims, 12 Drawing Sheets

(56) References Cited

U.S. PATENT DOCUMENTS

| | | | | |
|---|---|---|---|---|
| 2011/0216761 | A1* | 9/2011 | Rytina et al. | H04L 47/15 |
| 2016/0142939 | A1* | 5/2016 | Yi et al. | H04W 28/065 |
| 2017/0374633 | A1 | 12/2017 | Li et al. | |
| 2019/0268815 | A1* | 8/2019 | Zhu et al. | H04W 36/026 |

FOREIGN PATENT DOCUMENTS

| | | | | |
|---|---|---|---|---|
| WO | 2011035616 | A1 | 3/2011 | |
| WO | WO2021197468 | A * | 10/2021 | H04W 4/06 |

OTHER PUBLICATIONS

Oppo, "The SDAP supporting for MR-DC", 3GPP TSG-RAN2 Meeting #103, R2-1811353, Aug. 20-24, 5 Pages, Gothenburg, Sweden.

* cited by examiner

MULTICAST TRANSMISSION METHOD AND RELATED APPARATUS

CROSS-REFERENCE TO RELATED APPLICATIONS

This application is a continuation of International Application No. PCT/CN2020/083923, filed on Apr. 9, 2020, the disclosure of which is hereby incorporated by reference in its entirety.

TECHNICAL FIELD

This application relates to the field of communication technologies, and in particular, to a multicast transmission method and a related apparatus.

BACKGROUND

A multimedia broadcast multicast service (MBMS) is a service oriented to a plurality of terminal devices, for example, a live broadcast service and some public safety services.

Currently, a base station may send the MBMS service to a terminal device in a unicast transmission mode by establishing a dedicated bearer with the single terminal device, or may send the MBMS service to a plurality of terminal devices in a multicast (groupcast) transmission mode by establishing a shared bearer with the plurality of terminal devices. In an actual transmission process, the base station may choose, depending on a situation, to send the MBMS service to a terminal device through the dedicated radio bearer or the shared radio bearer. Therefore, from the perspective of a terminal device, the terminal device may receive a data packet through the dedicated radio bearer sometimes, and receive a data packet through a shared radio bearer sometimes. In this case, due to different sending statuses of different radio bearers, interruption, out of order, or redundancy may occur in data packets of the MBMS service when the terminal device receives the data packets of the MBMS service, affecting user experience.

SUMMARY

I This application provides a multicast transmission method and a related apparatus. When a network device sends data packets to a terminal device, the network device sets a sequence number of a first protocol layer of the data packet. Therefore, the terminal device may accordingly process the received data packets based on the sequence number of the first protocol layer in the case of duplication, out of order, packet lost, incorrect reception, or the like for the received data packets, to improve communication efficiency.

According to a first aspect, this application provides a multicast transmission method. The method is applicable to a first network device and includes: receiving a first data packet and first indication information, where the first indication information indicates a sequence of the first data packet in at least one data packet; setting a sequence number of a first protocol layer of the first data packet based on the first indication information; and sending the first data packet to a terminal device.

In the foregoing method, for sending the first data packet to the terminal device, the first network device sets the sequence number of the first protocol layer of the first data packet, and then sends the first data packet to the terminal device. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

With reference to the first aspect, in a possible implementation of the first aspect, the sequence number of the first protocol layer is set based on a first sequence number in the first indication information.

With reference to the first aspect, in a possible implementation of the first aspect, the sequence number of the first protocol layer is the same as the first sequence number, or a difference between the sequence number of the first protocol layer and the first sequence number is a fixed value N.

With reference to the first aspect, in a possible implementation of the first aspect, the first protocol layer corresponds to at least two radio bearers.

With reference to the first aspect, in a possible implementation of the first aspect, before the sending the first data packet to a terminal device, the method further includes: sending second indication information and/or third indication information to the terminal device, where the second indication information and/or the third indication information indicate/indicates a correspondence between the first protocol layer and the at least two radio bearers.

With reference to the first aspect, in a possible implementation of the first aspect, the second indication information includes configuration information of the first protocol layer of the terminal device.

With reference to the first aspect, in a possible implementation of the first aspect, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

With reference to the first aspect, in a possible implementation of the first aspect, the third indication information is for configuring a radio bearer, a PDCP layer, an RLC layer, or a logical channel of the terminal device, and the third indication information includes an identifier of the first protocol layer of the terminal device.

With reference to the first aspect, in a possible implementation of the first aspect, the method further includes: sending a data packet at the first protocol layer to a target access network device, where the first network device is an access network device to which the terminal device belongs.

According to a second aspect, this application provides a multicast transmission method. The method is applicable to a terminal device and includes: receiving a first data packet, where a sequence number of a first protocol layer of the first data packet is set based on first indication information, and the first indication information indicates a sequence of the first data packet in at least one data packet; and processing the first data packet based on the sequence number of the first protocol layer.

In the foregoing method, the terminal device receives the first data packet, where the first data packet includes the sequence number of the first protocol layer. In this way, all data packets received by the terminal device include corresponding sequence numbers of the first protocol layers.

Therefore, the terminal device may accordingly process the received data packets based on the sequence number of the first protocol layer in the case of duplication, out of order, packet lost, incorrect reception, or the like for the received data packets, to improve communication efficiency.

With reference to the second aspect, in a possible implementation of the second aspect, the sequence number of the first protocol layer is set based on a first sequence number in the first indication information.

With reference to the second aspect, in a possible implementation of the second aspect, the sequence number of the first protocol layer is the same as the first sequence number, or a difference between the sequence number of the first protocol layer and the first sequence number is a fixed value N.

With reference to the second aspect, in a possible implementation of the second aspect, the first protocol layer corresponds to at least two radio bearers.

With reference to the second aspect, in a possible implementation of the second aspect, before receiving a first data packet, the method further includes: receiving second indication information and/or third indication information, where the second indication information and/or the third indication information indicate/indicates a correspondence between the first protocol layer and the at least two radio bearers.

With reference to the second aspect, in a possible implementation of the second aspect, the second indication information includes configuration information of the first protocol layer of the terminal device.

With reference to the second aspect, in a possible implementation of the second aspect, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

With reference to the second aspect, in a possible implementation of the second aspect, the third indication information is for configuring a radio bearer, a PDCP layer, an RLC layer, or a logical channel of the terminal device, and the third indication information includes an identifier of the first protocol layer of the terminal device.

With reference to the second aspect, in a possible implementation of the second aspect, the first protocol layer of the terminal device is configured to perform at least one of the following processing on the first data packet: reordering, duplicate detection, discarding, transferring to an upper layer, or feeding back for the first data packet.

According to a third aspect, this application provides a communication apparatus. The communication apparatus is used in a first network device and includes a transceiver module and a processing module. The transceiver module is configured to receive a first data packet and first indication information, where the first indication information indicates a sequence of the first data packet in at least one data packet. The processing module is configured to set a sequence number of a first protocol layer of the first data packet based on the first indication information. The transceiver module is further configured to send the first data packet to a terminal device.

With reference to the third aspect, in a possible implementation of the third aspect, the sequence number of the first protocol layer is set based on a first sequence number in the first indication information.

With reference to the third aspect, in a possible implementation of the third aspect, the sequence number of the first protocol layer is the same as the first sequence number, or a difference between the sequence number of the first protocol layer and the first sequence number is a fixed value N.

With reference to the third aspect, in a possible implementation of the third aspect, the first protocol layer corresponds to at least two radio bearers.

With reference to the third aspect, in a possible implementation of the third aspect, the transceiver module is further configured to send second indication information and/or third indication information to the terminal device, where the second indication information and/or the third indication information indicate/indicates a correspondence between the first protocol layer and the at least two radio bearers.

With reference to the third aspect, in a possible implementation of the third aspect, the second indication information includes configuration information of the first protocol layer of the terminal device.

With reference to the third aspect, in a possible implementation of the third aspect, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

With reference to the third aspect, in a possible implementation of the third aspect, the third indication information is for configuring a radio bearer, a PDCP layer, an RLC layer, or a logical channel of the terminal device, and the third indication information includes an identifier of the first protocol layer of the terminal device.

With reference to the third aspect, in a possible implementation of the third aspect, the transceiver module is further configured to send a data packet at the first protocol layer to a target access network device, where the first network device is an access network device to which the terminal device belongs.

According to a fourth aspect, this application provides a communication apparatus. The communication apparatus is used in a terminal device and includes a transceiver module and a processing module. The transceiver module is configured to receive a first data packet, where a sequence number of a first protocol layer of the first data packet is set based on first indication information, and the first indication information indicates a sequence of the first data packet in at least one data packet. The processing module is configured to process the first data packet based on the sequence number of the first protocol layer.

With reference to the fourth aspect, in a possible implementation of the fourth aspect, the sequence number of the first protocol layer is set based on a first sequence number in the first indication information.

With reference to the fourth aspect, in a possible implementation of the fourth aspect, the sequence number of the first protocol layer is the same as the first sequence number, or a difference between the sequence number of the first protocol layer and the first sequence number is a fixed value N.

With reference to the fourth aspect, in a possible implementation of the fourth aspect, the first protocol layer corresponds to at least two radio bearers.

With reference to the fourth aspect, in a possible implementation of the fourth aspect, the transceiver module is further configured to receive second indication information and/or third indication information, where the second indication information and/or the third indication information indicate/indicates a correspondence between the first protocol layer and the at least two radio bearers.

With reference to the fourth aspect, in a possible implementation of the fourth aspect, the second indication information includes configuration information of the first protocol layer of the terminal device.

With reference to the fourth aspect, in a possible implementation of the fourth aspect, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

With reference to the fourth aspect, in a possible implementation of the fourth aspect, the third indication information is for configuring a radio bearer, a PDCP layer, an RLC layer, or a logical channel of the terminal device, and the third indication information includes an identifier of the first protocol layer of the terminal device.

With reference to the fourth aspect, in a possible implementation of the fourth aspect, the first protocol layer of the terminal device is configured to perform at least one of the following processing on the first data packet: reordering, duplicate detection, discarding, transferring to an upper layer, or feeding back for the first data packet.

According to a fifth aspect, this application provides a communication apparatus, including a processor and a communication interface, and optionally, further including a memory. The communication interface is coupled to the processor, and the processor is configured to run a computer program or instructions to implement the method in any one of the first aspect or the possible implementations of the first aspect. Optionally, the communication apparatus may be a chip.

According to a sixth aspect, this application provides a computer-readable storage medium. The computer-readable storage medium stores a computer program, the computer program includes program instructions, and when the program instructions are executed by a processor, the processor is enabled to perform the method in any one of the first aspect or the possible implementations of the first aspect.

According to a seventh aspect, this application provides a communication apparatus, including a processor and a communication interface, and optionally, further including a memory. The communication interface is coupled to the processor, and the processor is configured to run a computer program or instructions to implement the method in any one of the second aspect or the possible implementations of the second aspect. Optionally, the communication apparatus may be a chip.

According to an eighth aspect, this application provides a computer-readable storage medium. The computer-readable storage medium stores a computer program, the computer program includes program instructions, and when the program instructions are executed by a processor, the processor is enabled to perform the method in any one of the second aspect or the possible implementations of the second aspect.

According to a ninth aspect, this application provides a communication system. The communication system includes the communication apparatus described in the third aspect or the fourth aspect, or the communication apparatus described in the fifth aspect or the seventh aspect.

According to a tenth aspect, this application provides a multicast transmission method. The method is applicable to a second network device and includes: receiving a first data packet and fourth indication information, where the fourth indication information indicates a sequence of the first data packet in at least one data packet; setting a sequence number of a first protocol layer of the first data packet based on the fourth indication information; and sending the first data packet to a terminal device via a first network device.

In the foregoing method, for sending the first data packet to the terminal device, the second network device sets the sequence number of the first protocol layer of the first data packet, and then sends the first data packet to the terminal device via the first network device. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

With reference to the tenth aspect, in a possible implementation of the tenth aspect, the sequence number of the first protocol layer is set based on a second sequence number in the fourth indication information.

With reference to the tenth aspect, in a possible implementation of the tenth aspect, the sequence number of the first protocol layer is the same as the second sequence number, or a difference between the sequence number of the first protocol layer and the second sequence number is a fixed value N.

With reference to the tenth aspect, in a possible implementation of the tenth aspect, the first protocol layer corresponds to at least two radio bearers.

With reference to the tenth aspect, in a possible implementation of the tenth aspect, before the sending the first data packet to a terminal device via a first network device, the method further includes: sending fifth indication information to the terminal device; and sending sixth indication information to the first network device, where the fifth indication information and the sixth indication information indicate a correspondence between the first protocol layer and the at least two radio bearers.

With reference to the tenth aspect, in a possible implementation of the tenth aspect, the fifth indication information includes configuration information of the first protocol layer of the terminal device.

With reference to the tenth aspect, in a possible implementation of the tenth aspect, the fifth indication information includes at least one piece of second identification information, and the at least one piece of second identification information includes at least one of the following: a transmission channel identifier, an identifier of the first protocol layer of the terminal device, and a service identifier of the first data packet.

With reference to the tenth aspect, in a possible implementation of the tenth aspect, the sixth indication information is for configuring a radio bearer, a PDCP layer, an RLC layer, or a logical channel of the terminal device, and the sixth indication information includes the at least one piece of second identification information.

According to an eleventh aspect, this application provides a multicast transmission method. The method is applicable to a first network device and includes: receiving a first data packet, where a sequence number of a first protocol layer of the first data packet is set based on fourth indication information, and the fourth indication information indicates a sequence of the first data packet in at least one data packet; and sending the first data packet to a terminal device.

In the foregoing method, the first data packet received by the first network device includes the sequence number of the first protocol layer, and then the first network device sends the first data packet to the terminal device. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

With reference to the eleventh aspect, in a possible implementation of the eleventh aspect, the sequence number of the first protocol layer is set based on a second sequence number in the fourth indication information.

With reference to the eleventh aspect, in a possible implementation of the eleventh aspect, the sequence number of the first protocol layer is the same as the second sequence number, or a difference between the sequence number of the first protocol layer and the second sequence number is a fixed value N.

With reference to the eleventh aspect, in a possible implementation of the eleventh aspect, the first protocol layer corresponds to at least two radio bearers.

With reference to the eleventh aspect, in a possible implementation of the eleventh aspect, before the sending the first data packet to a terminal device, the method further includes: receiving sixth indication information, where the sixth indication information indicates a correspondence between the first protocol layer and the at least two radio bearers.

With reference to the eleventh aspect, in a possible implementation of the eleventh aspect, the sixth indication information is for configuring a radio bearer, a PDCP layer, an RLC layer, or a logical channel of the terminal device, the sixth indication information includes at least one piece of second identification information, and the at least one piece of second identification information includes at least one of the following: a transmission channel identifier, an identifier of the first protocol layer of the terminal device, and a service identifier of the first data packet.

According to a twelfth aspect, this application provides a multicast transmission method. The method is applicable to a terminal device and includes: receiving a first data packet, where a sequence number of a first protocol layer of the first data packet is set based on fourth indication information, and the fourth indication information indicates a sequence of the first data packet in at least one data packet; and processing the first data packet based on the sequence number of the first protocol layer.

In the foregoing method, the terminal device receives the first data packet, where the first data packet includes the sequence number of the first protocol layer. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

With reference to the twelfth aspect, in a possible implementation of the twelfth aspect, the sequence number of the first protocol layer is set based on a second sequence number in the fourth indication information.

With reference to the twelfth aspect, in a possible implementation of the twelfth aspect, the sequence number of the first protocol layer is the same as the second sequence number, or a difference between the sequence number of the first protocol layer and the second sequence number is a fixed value N.

With reference to the twelfth aspect, in a possible implementation of the twelfth aspect, the first protocol layer corresponds to at least two radio bearers.

With reference to the twelfth aspect, in a possible implementation of the twelfth aspect, before the receiving a first data packet, the method further includes: receiving fifth indication information, where the fifth indication information indicates a correspondence between the first protocol layer and the at least two radio bearers.

With reference to the twelfth aspect, in a possible implementation of the twelfth aspect, the fifth indication information includes configuration information of the first protocol layer of the terminal device.

With reference to the twelfth aspect, in a possible implementation of the twelfth aspect, the fifth indication information includes at least one piece of second identification information, and the at least one piece of second identification information includes at least one of the following: a transmission channel identifier, an identifier of the first protocol layer of the terminal device, and a service identifier of the first data packet.

With reference to the twelfth aspect, in a possible implementation of the twelfth aspect, the first protocol layer of the terminal device is configured to perform at least one of the following processing on the first data packet: reordering, duplicate detection, discarding, transferring to an upper layer, or feeding back for the first data packet.

According to a thirteenth aspect, this application provides a communication apparatus. The communication apparatus is used in a second network device and includes a transceiver module and a processing module. The transceiver module is configured to receive a first data packet and fourth indication information, where the fourth indication information indicates a sequence of the first data packet in at least one data packet. The processing module is configured to set a sequence number of a first protocol layer of the first data packet based on the fourth indication information. The transceiver module is further configured to send the first data packet to a terminal device via a first network device.

With reference to the thirteenth aspect, in a possible implementation of the thirteenth aspect, the sequence number of the first protocol layer is set based on a second sequence number in the fourth indication information.

With reference to the thirteenth aspect, in a possible implementation of the thirteenth aspect, the sequence number of the first protocol layer is the same as the second sequence number, or a difference between the sequence number of the first protocol layer and the second sequence number is a fixed value N.

With reference to the thirteenth aspect, in a possible implementation of the thirteenth aspect, the first protocol layer corresponds to at least two radio bearers.

With reference to the thirteenth aspect, in a possible implementation of the thirteenth aspect, the transceiver module is further configured to: send fifth indication information to the terminal device; and send sixth indication information to the first network device, where the fifth indication information and the sixth indication information indicate a correspondence between the first protocol layer and the at least two radio bearers.

With reference to the thirteenth aspect, in a possible implementation of the thirteenth aspect, the fifth indication information includes configuration information of the first protocol layer of the terminal device.

With reference to the thirteenth aspect, in a possible implementation of the thirteenth aspect, the fifth indication information includes at least one piece of second identification information, and the at least one piece of second identification information includes at least one of the following: a transmission channel identifier, an identifier of the first protocol layer of the terminal device, and a service identifier of the first data packet.

With reference to the thirteenth aspect, in a possible implementation of the thirteenth aspect, the sixth indication information is for configuring a radio bearer, a PDCP layer, an RLC layer, or a logical channel of the terminal device, and the sixth indication information includes the at least one piece of second identification information.

According to a fourteenth aspect, this application provides a communication apparatus. The communication apparatus is used in a first network device and includes a transceiver module. The transceiver module is configured to receive a first data packet, where a sequence number of a first protocol layer of the first data packet is set based on fourth indication information, and the fourth indication information indicates a sequence of the first data packet in at least one data packet. The transceiver module is further configured to send the first data packet to a terminal device.

With reference to the fourteenth aspect, in a possible implementation of the fourteenth aspect, the sequence number of the first protocol layer is set based on a second sequence number in the fourth indication information.

With reference to the fourteenth aspect, in a possible implementation of the fourteenth aspect, the sequence number of the first protocol layer is the same as the second sequence number, or a difference between the sequence number of the first protocol layer and the second sequence number is a fixed value N.

With reference to the fourteenth aspect, in a possible implementation of the fourteenth aspect, the first protocol layer corresponds to at least two radio bearers.

With reference to the fourteenth aspect, in a possible implementation of the fourteenth aspect, the transceiver module is further configured to receive sixth indication information, where the sixth indication information indicates a correspondence between the first protocol layer and the at least two radio bearers.

With reference to the fourteenth aspect, in a possible implementation of the fourteenth aspect, the sixth indication information is for configuring a radio bearer, a PDCP layer, an RLC layer, or a logical channel of the terminal device, the sixth indication information includes at least one piece of second identification information, and the at least one piece of second identification information includes at least one of the following: a transmission channel identifier, an identifier of the first protocol layer of the terminal device, and a service identifier of the first data packet.

According to a fifteenth aspect, this application provides a communication apparatus. The communication apparatus is used in a terminal device and includes a transceiver module and a processing module. The transceiver module is configured to receive a first data packet, where a sequence number of a first protocol layer of the first data packet is set based on fourth indication information, and the fourth indication information indicates a sequence of the first data packet in at least one data packet. The processing module is configured to process the first data packet based on the sequence number of the first protocol layer.

With reference to the fifteenth aspect, in a possible implementation of the fifteenth aspect, the sequence number of the first protocol layer is set based on a second sequence number in the fourth indication information.

With reference to the fifteenth aspect, in a possible implementation of the fifteenth aspect, the sequence number of the first protocol layer is the same as the second sequence number, or a difference between the sequence number of the first protocol layer and the second sequence number is a fixed value N.

With reference to the fifteenth aspect, in a possible implementation of the fifteenth aspect, the first protocol layer corresponds to at least two radio bearers.

With reference to the fifteenth aspect, in a possible implementation of the fifteenth aspect, the transceiver module is further configured to receive fifth indication information, where the fifth indication information indicates a correspondence between the first protocol layer and the at least two radio bearers.

With reference to the fifteenth aspect, in a possible implementation of the fifteenth aspect, the fifth indication information includes configuration information of the first protocol layer of the terminal device.

With reference to the fifteenth aspect, in a possible implementation of the fifteenth aspect, the fifth indication information includes at least one piece of second identification information, and the at least one piece of second identification information includes at least one of the following: a transmission channel identifier, an identifier of the first protocol layer of the terminal device, and a service identifier of the first data packet.

With reference to the fifteenth aspect, in a possible implementation of the fifteenth aspect, the first protocol layer of the terminal device is configured to perform at least one of the following processing on the first data packet: reordering, duplicate detection, discarding, transferring to an upper layer, or feeding back for the first data packet.

According to a sixteenth aspect, this application provides a communication apparatus, including a processor and a communication interface, and optionally, further including a memory. The communication interface is coupled to the processor, and the processor is configured to run a computer program or instructions to implement the method in any one of the tenth aspect or the possible implementations of the tenth aspect. Optionally, the communication apparatus may be a chip.

According to a seventeenth aspect, this application provides a computer-readable storage medium. The computer-readable storage medium stores a computer program, the computer program includes program instructions, and when the program instructions are executed by a processor, the processor is enabled to perform the method in any one of the tenth aspect or the possible implementations of the tenth aspect.

According to an eighteenth aspect, this application provides a communication apparatus, including a processor and a communication interface, and optionally, further including a memory. The communication interface is coupled to the processor, and the processor is configured to run a computer program or instructions to implement the method in any one of the eleventh aspect or the possible implementations of the eleventh aspect. Optionally, the communication apparatus may be a chip.

According to a nineteenth aspect, this application provides a computer-readable storage medium. The computer-readable storage medium stores a computer program, the computer program includes program instructions, and when the program instructions are executed by a processor, the processor is enabled to perform the method in any one of the eleventh aspect or the possible implementations of the eleventh aspect.

According to a twentieth aspect, this application provides a communication apparatus, including a processor and a communication interface, and optionally, further including a memory. The communication interface is coupled to the processor, and the processor is configured to run a computer program or instructions to implement the method in any one of the twelfth aspect or the possible implementations of the twelfth aspect. Optionally, the communication apparatus may be a chip.

According to a twenty-first aspect, this application provides a computer-readable storage medium. The computer-readable storage medium stores a computer program, the computer program includes program instructions, and when the program instructions are executed by a processor, the processor is enabled to perform the method in any one of the twelfth aspect or the possible implementations of the twelfth aspect.

According to a twenty-second aspect, this application provides a communication system. The communication system includes the communication apparatus described in the thirteenth aspect, the fourteenth aspect, or the fifteenth aspect, or the communication apparatuses described in the sixteenth aspect, the eighteenth aspect, or the twentieth aspect.

DETAILED DESCRIPTION OF ILLUSTRATIVE EMBODIMENTS

Figure 1:
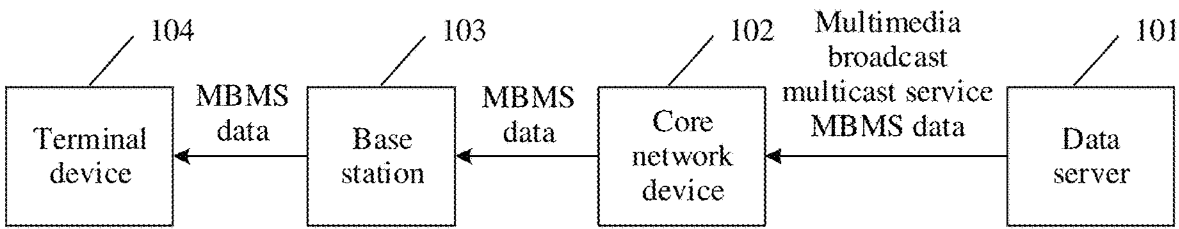
FIG. 1 is a schematic diagram of MBMS service data transmission.

The following describes technical solutions of this application with reference to accompanying drawings.

In the following, some terms in embodiments of this application are described, to help a person skilled in the art have a better understanding.

It should be understood that the technical solutions in embodiments of this application may be used for a 5G communication system, or may be used for a long term evolution (LTE) architecture, a universal mobile telecommunications system (UMTS) terrestrial radio access network (UTRAN) architecture, or a global system for mobile communications (GSM)/enhanced data rates for GSM evolution (EDGE) system radio access network (GERAN) architecture. In the UTRAN architecture or the GERAN architecture, a function of an MME is completed by a serving general packet radio service (GPRS) support node (SGSN), and a function of an SGW/a PGW is completed by a gateway GPRS support node (GGSN). The technical solutions in embodiments of this application may be applied to another communication system such as a public land mobile network (PLMN) system or even a communication system after 5G. This is not limited in embodiments of this application.

Embodiments of this application relate to a terminal device. The terminal device is a terminal device in a 5G network, or may be a device that provides a user with voice and/or data connectivity, for example, may be a handheld device with a wireless connection function, or a processing device connected to a wireless modem. The terminal device may communicate with a core network via a radio access network (RAN), and exchange voice and/or data with the RAN. The terminal device may be user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, or a portable, pocket-sized, handheld, or computer-built-in mobile apparatus. For example, the terminal device may be a device such as a personal communications service (PCS) phone, a cordless phone, a session initiation protocol (SIP) phone, a wireless local loop (WLL) station, or a personal digital assistant (PDA). The terminal device may be alternatively a limited device, for example, a device with low power consumption, a device with a limited storage capability, or a device with a limited computing capability. The terminal device may be an information sensing device such as a barcode, radio frequency identification (RFID), a sensor, a global positioning system (GPS), and a laser scanner, or a terminal device in a network after 5G. This is not limited in embodiments of this application.

By way of example, and not limitation, in embodiments of this application, the terminal device may be alternatively a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

Embodiments of this application further relate to a first network device. The first network device may be a device configured to communicate with the terminal device. For example, the first network device may be network-side device in a 5G network, a base transceiver station (BTS) in a GSM system or a CDMA system, a NodeB (NB) in a WCDMA system, or an evolved NodeB (eNB or eNodeB) in an LTE system. Alternatively, the first network device may be a relay station, an access point, a vehicle-mounted device, a wearable device, a network-side device in a network after 5G, a network device in a future evolved PLMN network, or the like.

The first network device in embodiments of this application may also be referred to as a radio access network (RAN) device. The RAN device is connected to the terminal device, and is configured to receive data from the terminal device and send the data to the core network device. The RAN device corresponds to different devices in different communication systems, for example, corresponds to a base station and a base station controller in a 2G system, corresponds to a base station and a radio network controller (RNC) in a 3G system, corresponds to an evolved NodeB (eNB) in a 4G system, and in a 5G system, corresponds to an access network device (for example, a gNB, a CU, or a DU) in the 5G system such as a new radio access system (new radio access technology, NR).

Embodiments of this application further relate to a second network device. The second network device may be a device configured to communicate with the terminal device via the first network device, for example, may be a network-side device in a 5G network, or may be a network-side device in another communication system. The second network device in embodiments of this application may also be referred to as a core network (CN) device. The CN device performs data communication with the terminal device via the RAN device. The CN device corresponds to different devices in different communication systems, for example, in a 5G system, corresponds to a core network device (for example, a user plane function (UPF) device) in the 5G system such as a new radio access system (new radio access technology, NR).

In embodiments of this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit a sequence, a time sequence, priorities, or importance of the plurality of objects. For example, first information and second information are merely intended to distinguish between different information, but do not indicate that the two types of information are different in content, priorities, sending sequences, importance, or the like.

For ease of understanding of embodiments of this application, concepts in this application are first explained.

Unicast: a point-to-point communication technology, to be specific, single-point communication between a network device and a terminal device. The network device may separately send data to each terminal device. The unicast may also be referred to as a unicast transmission mode or a unicast transmission technology.

Sending performed in the unicast transmission mode means: When sending a transport block (TB) corresponding to a protocol data unit (PDU), a sending apparatus scrambles, using a cell radio network temporary identifier (C-RNTI), the PDU or downlink control information (DCI) corresponding to the PDU, and a receiving apparatus receives the same PDU based on the C-RNTI. Alternatively, transmitting a PDU in the unicast mode may mean: The PDU is transmitted through a radio bearer established for unicast transmission or through a channel specially designed for the unicast.

Receiving performed in the unicast transmission mode means: When sending is performed in the unicast mode, the receiving apparatus receives the PDU based on the C-RNTI, or the receiving apparatus receives the PDU through the radio bearer established for the unicast transmission or through the channel used for the unicast transmission.

Multicast: a point-to-multipoint communication technology, which may also be referred to as a multicast transmission mode or a multicast transmission technology, and is for serving a multimedia broadcast multicast service. The multicast may also be referred to as groupcast, and may also be referred to as a broadcast technology in some generalized scenarios. However, the multicast is different from a conventional broadcast technology. When the multicast transmission mode is used, a plurality of terminal devices simultaneously receive a same piece of data in a process in which a network device (for example, a base station) sends the data. Currently, multicast transmission technologies are mainly classified into two types: a multimedia broadcast multicast service single frequency network (MBSFN) service and a single-cell point-to-multipoint (SC-PTM) service. In addition, another multicast transmission technology is also discussed. This is not limited in this application.

Sending performed in the multicast transmission mode means: When sending a TB corresponding to a PDU, a sending apparatus scrambles, using a group radio network temporary identifier (G-RNTI), the PDU or DCI corresponding to the PDU, and one or more receiving apparatuses receive the same PDU based on the same G-RNTI. Alternatively, transmitting a PDU in the multicast mode may mean: A plurality of receiving apparatuses are notified of a location of a same PDU in a semi-persistent manner, and the plurality of receiving apparatuses may simultaneously receive the PDU. Alternatively, transmitting a PDU in the multicast mode may mean: The PDU is transmitted through a radio bearer established for multicast transmission or through a channel specially designed for the multicast.

Receiving performed in the multicast transmission mode means: When sending is performed by a peer side in the multicast mode, one of the plurality of receiving apparatuses receives the PDU based on the G-RNTI, or one of the plurality of receiving apparatuses receives the PDU through the radio bearer established for the multicast transmission or through the channel used for the multicast transmission.

Broadcast: a point-to-multipoint communication technology. Different from multicast, the technology related to the broadcast is: A sending apparatus sends a TB corresponding to a PDU through a broadcast channel, and all receiving apparatuses may receive the PDU through the broadcast channel. Different from a multicast technology, in conventional broadcast transmission, the foregoing scrambling manner using the G-RNTI is not used for the broadcast channel.

Handover (HO): In a wireless communication system, each cell covers a limited range. Therefore, when a terminal device moves from a current serving cell to a neighboring cell, to ensure service continuity, a network side needs to hand over a service to the neighboring cell, so that a communication process is not interrupted. Handover is a process of handing over a link carrying communication data from a cell (or a base station) to another cell (or another base station) in a communication process for communication continuity.

Protocol stack refers to a specific protocol layer structure between a network device and a terminal device for mutual communication. For example, a control plane protocol layer structure may include a radio resource control (RRC) layer, a packet data convergence protocol (PDCP) layer, a radio link control (RLC) layer, a media access control (MAC) layer, a physical layer, and the like. A user plane protocol layer structure may include a PDCP layer, an RLC layer, a MAC layer, a physical layer, and the like. The physical layer is located at the lowest layer (layer 1), the MAC layer, the RLC layer, and the PDCP layer belong to the second layer (layer 2), and the RRC layer belongs to the third layer (layer 3). In an implementation, there may be a service data adaptation protocol (SDAP) layer above the PDCP layer. In addition, a transport layer, for example, a transmission control protocol/internet protocol (TCP/IP) layer, and an application layer, may further exist above the SDAP layer.

Functions of the protocol layers may be implemented by one node, or may be implemented by a plurality of nodes. For example, in an evolved structure, a radio access network device may include a centralized unit (CU) and a distributed unit (DU). A plurality of DUs may be centrally controlled by one CU. The CU and the DU may be obtained through division based on a protocol layer of a wireless network. For example, functions of the PDCP layer and a layer above the PDCP layer are set on the CU, and functions of a protocol layer below the PDCP layer, the RLC layer, the MAC layer, and the like are set on the DU.

It should be understood that division based on the protocol layer is merely an example, and division may alternatively be performed based on another protocol layer. For example, division is performed based on the RLC layer. Functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

Radio bearer: Generally, the radio bearer may be understood as a transmission path or treatment used when a data packet or signaling is transmitted over an air interface. Radio bearers include a data radio bearer and a signaling radio bearer. The radio bearer is established and configured using RRC signaling of a network device. A configuration of the radio bearer includes configurations of protocol layers. Protocol layer entities of the network device and a terminal device send, receive, or process the data packet or the signaling through the radio bearer based on the configuration. Technically, the radio bearer may be understood as a transmission channel. Regardless of a terminal device side or a network device side, each radio bearer includes one PDCP entity and at least one RLC entity to process the data packet transmitted through the radio bearer. In addition to establishing the radio bearer, the network device may further add, modify, or delete (release) the radio bearer using RRC signaling.

Multimedia broadcast multicast service (MBMS): The MBMS service is a unidirectional point-to-multipoint multimedia service. For example, multimedia broadcast services are sent over air interfaces to users in cells through common channels, or user-subscribed multicast services are sent to users in cells in a multicast mode, to save air interface resources.

FIG. 1 is a schematic diagram of MBMS service data transmission. As shown in FIG. 1, an MBMS service comes from a data server 101. First, the data server 101 sends MBMS service data to a core network device 102, then the core network device 102 sends the MBMS service data to a base station 103, and finally, the base station 103 sends the MBMS service data to a terminal device 104 that receives the MBMS service.

Between the core network device 102 and the base station 103, the core network device 102 sends the MBMS service data to the base station 103 using a protocol data unit (PDU) session or a quality of service (QoS) flow, and a same type of MBMS service data sent by the core network device 102 to a plurality of terminal devices 104 is sent to the base station 103 using a same PDU session.

Between the base station 103 and the terminal device 104, the MBMS service may be sent to the terminal device 104 in a unicast mode by establishing a dedicated radio bearer, or may be sent to the terminal device 104 in a multicast mode by establishing a shared radio bearer for the MBMS service.

Figure 2:
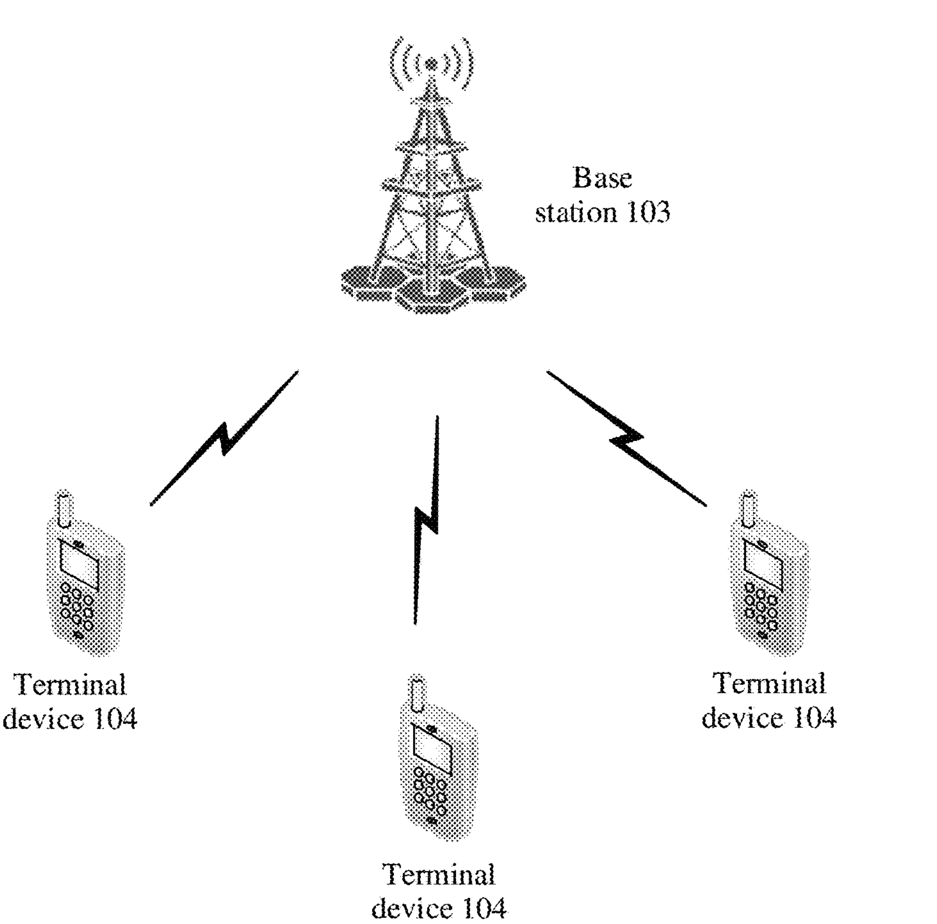
FIG. 2 is a schematic diagram of multicast transmission between a base station and terminal devices.

FIG. 2 is a schematic diagram of multicast transmission between a base station and terminal devices. As shown in FIG. 2, a plurality of terminal devices 104 need to receive a same MBMS service. If a base station 103 sends the MBMS service in a unicast mode, a dedicated radio bearer needs to be established for each terminal device 104 to separately send the MBMS service. This consumes a large quantity of resources. If the base station 103 sends the MBMS service in a multicast mode, only one shared MBMS radio bearer needs to be established, and all terminal devices 104 interested in the MBMS service may receive the MBMS service through the shared radio bearer. The base station 103 may determine, depending on an actual situation (for example, a quantity of terminal devices, a channel quality condition of the terminal device, or a geographical location of the terminal device), whether to send the MBMS service to the terminal device 104 in the unicast transmission mode, the multicast transmission mode, or both the unicast transmission mode and the multicast transmission mode.

Figure 3:
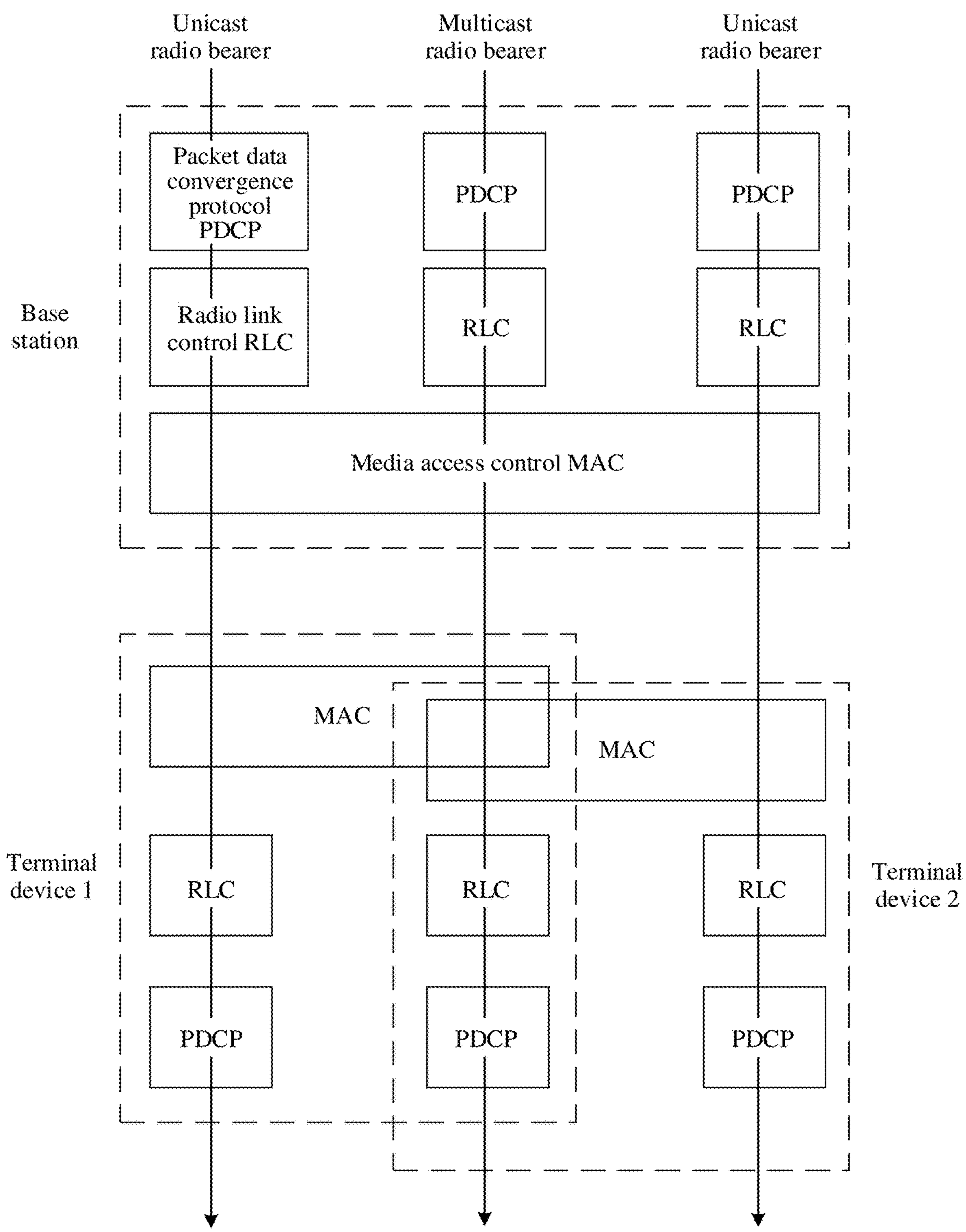
FIG. 3 is a schematic diagram in which a base station sends MBMS service data to terminal devices.

FIG. 3 is a schematic diagram in which a base station sends MBMS service data to terminal devices. As shown in FIG. 3, the base station may send the MBMS service data to each terminal device in one of the following three modes: only a unicast transmission mode, only a multicast transmission mode, and both the unicast transmission mode and the multicast transmission mode. In the case of using the unicast transmission mode, the base station uses a unicast radio bearer for data sending. In the case of using the multicast transmission mode, the base station uses a multicast radio bearer for data sending. This means that different radio bearers are used in the two transmission modes for data sending.

Depending on requirements of an MBMS service, transmission is usually performed in a mode switching between the two transmission modes or simultaneously using the two transmission modes. In other words, sometimes the unicast radio bearer is used for data transmission, sometimes the multicast radio bearer is used for data transmission, and sometimes the two radio bearers are both used for data transmission. When data packets of a same MBMS service are sent through the two radio bearers, due to different sending statuses (for example, different sending rates) of different radio bearers, out of order may occur in the data packets of the MBMS service that are originally in a specific sequence. For example, a data packet 1 and a data packet 2 are sent through a multicast radio bearer, and a data packet 3 and a data packet 4 are sent through a unicast radio bearer. However, because a sending rate of the unicast radio bearer is higher, the data packet 3 and the data packet 4 are received by the terminal device prior to the data packet 1 and the data packet 2. As a result, out of order occurs in the data packets. In addition, in the case of using two radio bearers for data transmission, a data packet is repeatedly received. For example, the data packet 1 is sent through both the unicast radio bearer and the multicast radio bearer. As a result, the terminal device repeatedly receives the data packet 1, causing redundancy reception. In addition, data packet loss may occur. For example, the data packet 1 is sent through the multicast radio bearer, but the terminal device fails to receive it. Then, the terminal device cannot continue to receive the data packet 1 after switching to the unicast radio bearer.

The foregoing describes the background technology of this application, and the following describes technical features of embodiments of this application.

Figure 4:
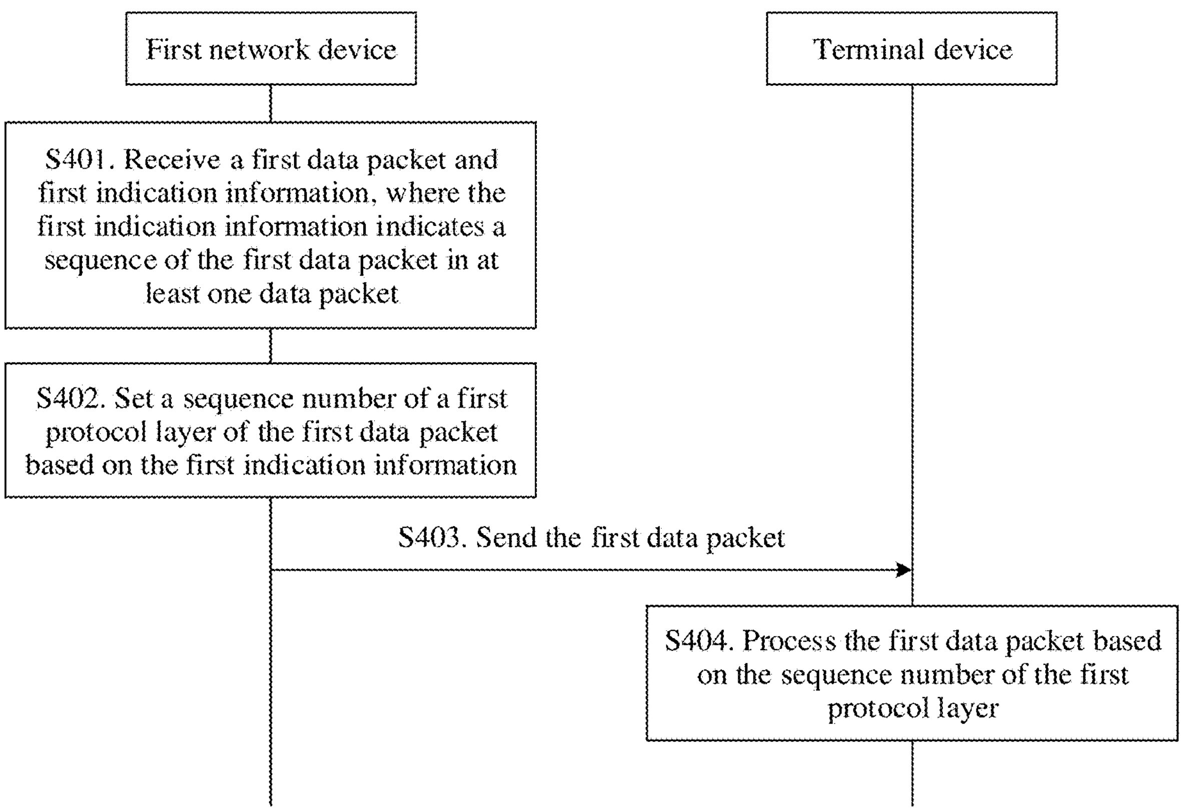
FIG. 4 is a schematic diagram of a multicast transmission method according to an embodiment of this application.

FIG. 4 is a schematic diagram of a multicast transmission method according to an embodiment of this application. As shown in FIG. 4, the multicast transmission method includes the following steps.

S401. A first network device receives a first data packet and first indication information, where the first indication information indicates a sequence of the first data packet in at least one data packet.

Optionally, the first indication information may be sent to the first network device together with the first data packet, for example, carried in the data packet or carried in a header of the data packet, or may be sent to the first network device separately from the first data packet. This is not limited herein.

Optionally, the first network device is an access network device to which a terminal device belongs, and the first data packet and the first indication information are sent by a core network device to the first network device.

S402. The first network device sets a sequence number of a first protocol layer of the first data packet based on the first indication information.

This step may also be understood as that the first network device determines the sequence number of the first protocol layer of the first data packet based on the first indication information.

The first protocol layer is a protocol layer above a PDCP layer. Specifically, the first protocol layer may be an existing protocol layer (for example, an SDAP layer or an IP layer) above the PDCP layer, or a newly designed protocol layer above the PDCP layer (a layer above the SDAP layer or an intermediate layer between the PDCP layer and the SDAP layer). This is not limited herein. The first protocol layer of the first network device is configured to implement at least one of the following functions during downlink transmission: adding a protocol layer header to a data packet, setting a sequence number of the first protocol layer for a data packet, receiving feedback information, segmenting or concatenating a data packet, retransmitting a data packet, and the like.

Optionally, each protocol entity of the first protocol layer is associated with at least one radio bearer. In an implementation, each protocol entity corresponds to at least two radio bearers, and the first network device sends a data packet of an MBMS service to the terminal device through the at least two radio bearers. The at least two radio bearers may be unicast radio bearers or multicast radio bearers, or a part of the at least two radio bearers may be unicast radio bearers and a part of the at least two radio bearers may be multicast radio bearers.

Optionally, the sequence number of the first protocol layer is set based on a first sequence number in the first indication information, where the first sequence number is set by the core network device or a data server.

In a possible implementation, the sequence number of the first protocol layer is the same as the first sequence number. In other words, the first network device sets the first sequence number in the first indication information to the sequence number of the first protocol layer of the first data packet.

In a possible implementation, a difference between the sequence number of the first protocol layer and the first sequence number is a fixed value N. In other words, the first network device sets the sequence number of the first protocol layer of the first data packet by adding the fixed value N to the first sequence number in the first indication information or subtracting the fixed value N from the first sequence number in the first indication information. The fixed value N is specified in a protocol or received by the first network device from another network device (for example, the core network device).

Optionally, the first network device may alternatively set the sequence number of the first protocol layer of the first data packet by itself. For example, after a first protocol layer entity is established, a sequence number of a data packet in the first protocol layer entity is set to 0 or 1, and is increased successively.

S403. The first network device sends the first data packet to the terminal device.

The first network device may send the first data packet to the terminal device through a unicast radio bearer or a multicast radio bearer, and the first data packet includes the sequence number of the first protocol layer that is set by the first network device.

S404. The terminal device processes the first data packet based on the sequence number of the first protocol layer.

Specifically, the first protocol layer of the terminal device is configured to perform at least one of the following processing on the first data packet: reordering, duplicate detection, discarding, transferring to an upper layer, or feeding back reception (for example, feeding back whether the first data packet is successfully received) of the first data packet.

In the foregoing method, for sending the first data packet to the terminal device, the first network device sets the sequence number of the first protocol layer of the first data packet, and then sends the first data packet to the terminal device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets. For example, in the case of duplicate reception, the terminal device may discard the duplicated data packet; in the case of out of order, the terminal device may reorder the data packets; and in the case of packet loss, the terminal device may send feedback information to a transmit end for retransmission. This ensures orderly processing of multicast services by setting the first protocol layer on the first network device and the terminal device, and improves communication efficiency.

Figure 5:
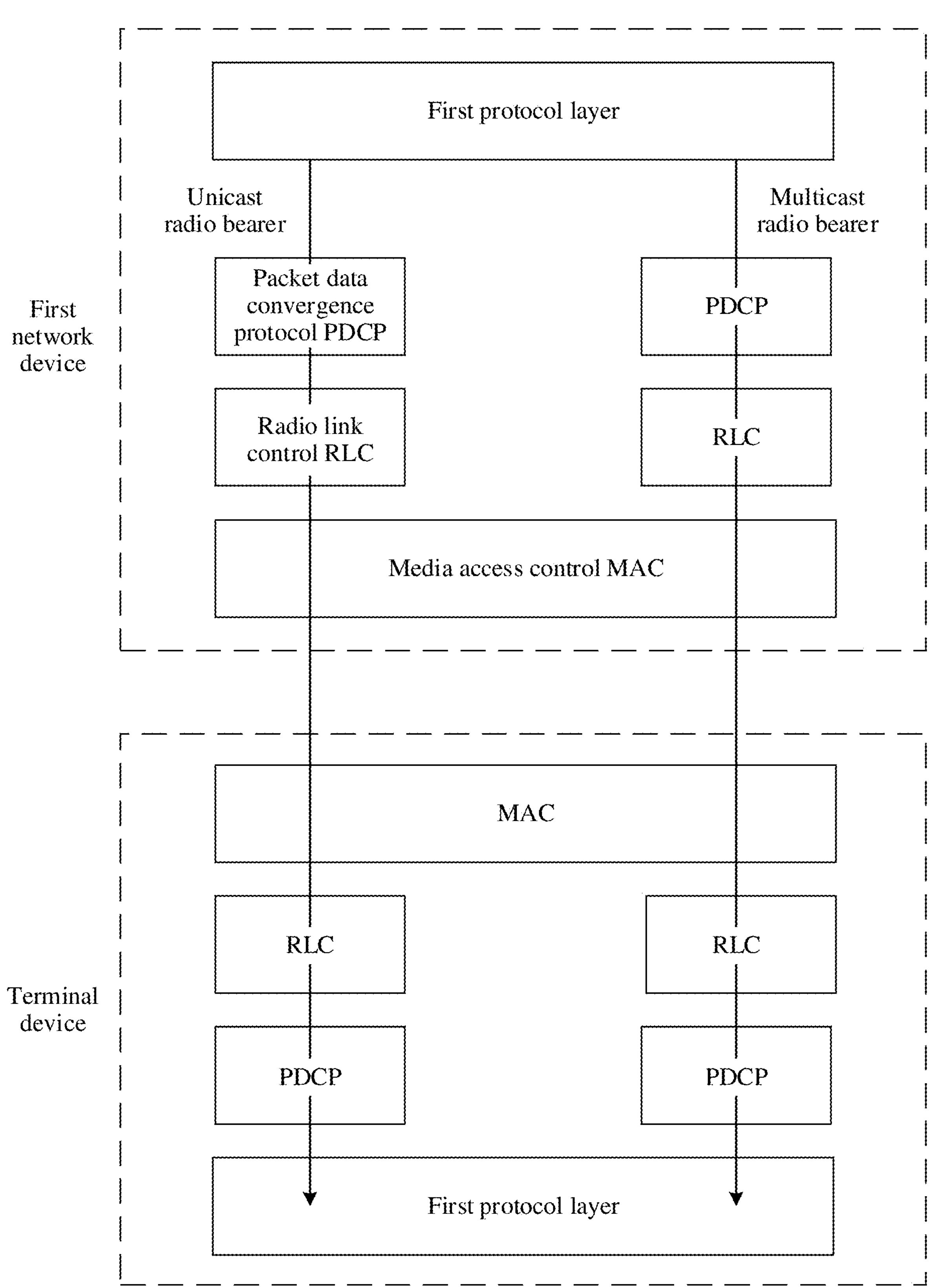
FIG. 5 is a schematic diagram in which a first network device sends MBMS service data to a terminal device in FIG. 4.

FIG. 5 is a schematic diagram in which a first network device sends MBMS service data to a terminal device in FIG. 4. As shown in FIG. 5, a first protocol layer is set on the first network device and the terminal device, where the first protocol layer is a protocol layer above a PDCP layer. Specifically, the first protocol layer may be an existing protocol layer (for example, an SDAP layer) above the PDCP layer, or a newly designed protocol layer above the PDCP layer (a layer above the SDAP layer or an intermediate layer between the PDCP layer and the SDAP layer). This is not limited herein.

The terminal device may receive, through a unicast radio bearer or a multicast radio bearer, a data packet of an MBMS service sent by the first network device. After the first protocol layer is set on the first network device and the terminal device, the first protocol layer of the first network device may be configured to set a sequence number of a first protocol layer of a data packet, receive feedback information, segment or concatenate a data packet, and/or retransmit a data packet. The first protocol layer of the terminal device may be configured to perform at least one of the following processing on a data packet: reordering, duplicate detection, discarding, transferring to an upper layer, and feeding back reception of a data packet. In this way, when the first network device sends MBMS service data to the terminal device, the first network device may process, at the first protocol layer, the data packet sent through the unicast radio bearer or the multicast radio bearer; and the terminal device may process, at the first protocol layer, the data packet received through the unicast radio bearer or the multicast radio bearer. This ensures that the terminal device can correctly process the data packet of the MBMS service received through different radio bearers, and ensures that data packets are delivered to an upper layer in order, without duplication, and without packet loss.

Figure 6:
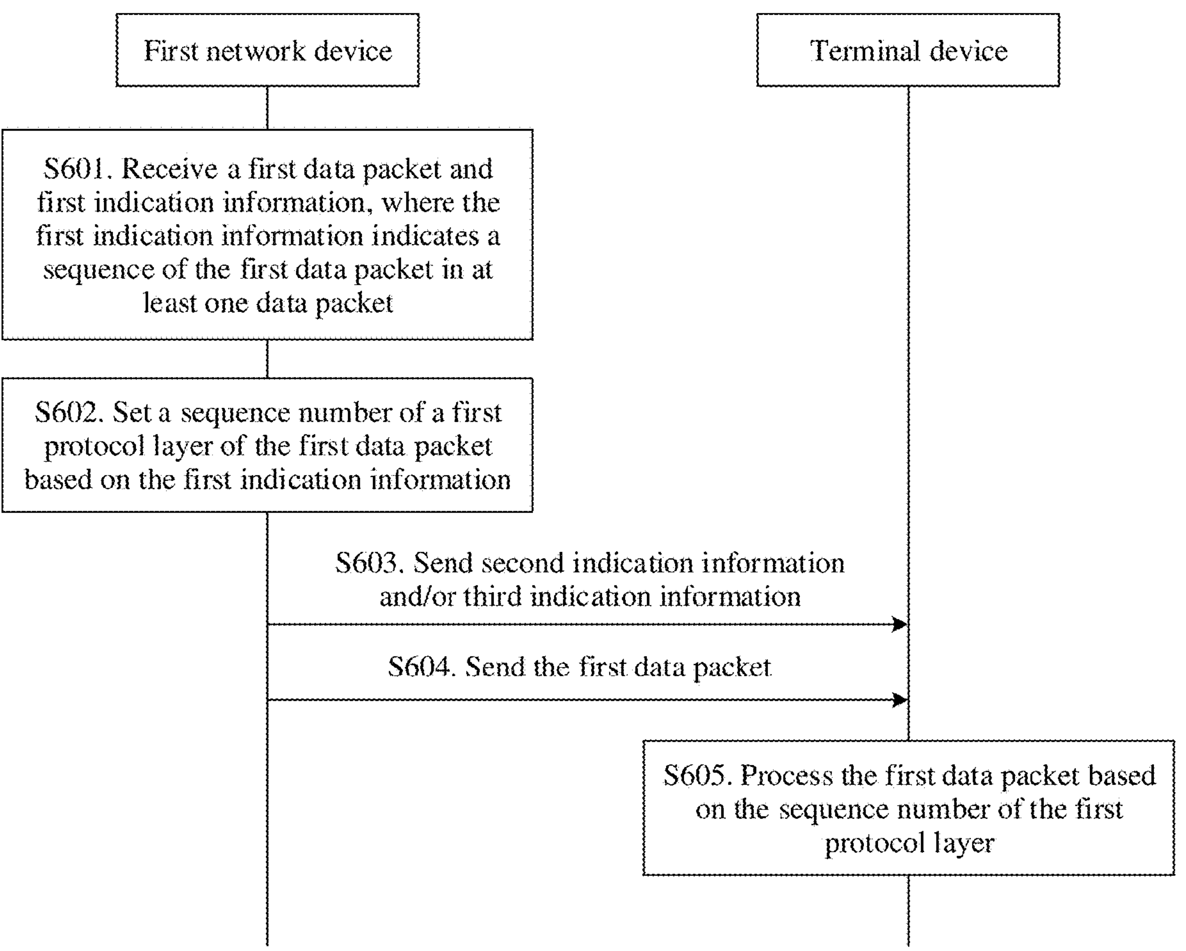
FIG. 6 is a schematic diagram of another multicast transmission method according to an embodiment of this application.

FIG. 6 is a schematic diagram of another multicast transmission method according to an embodiment of this application. As shown in FIG. 6, the multicast transmission method includes the following steps.

S601. A first network device receives a first data packet and first indication information, where the first indication information indicates a sequence of the first data packet in at least one data packet.

Optionally, the first indication information may be sent to the first network device together with the first data packet, for example, carried in the data packet or carried in a header of the data packet, or may be sent to the first network device separately from the first data packet. This is not limited herein.

Optionally, the first network device is an access network device to which a terminal device belongs, and the first data packet and the first indication information are sent by a core network device to the first network device.

S602. The first network device sets a sequence number of a first protocol layer of the first data packet based on the first indication information.

This step may also be understood as that the first network device determines the sequence number of the first protocol layer of the first data packet based on the first indication information.

The first protocol layer is a protocol layer above a PDCP layer. Specifically, the first protocol layer may be an existing protocol layer (for example, an SDAP layer or an IP layer) above the PDCP layer, or a newly designed protocol layer above the PDCP layer (a layer above the SDAP layer or an intermediate layer between the PDCP layer and the SDAP layer). This is not limited herein. The first protocol layer of the first network device is configured to implement at least one of the following functions during downlink transmission: adding a protocol layer header to a data packet, setting a sequence number of the first protocol layer for a data packet, receiving feedback information, segmenting or concatenating a data packet, retransmitting a data packet, and the like.

Optionally, each protocol entity of the first protocol layer is associated with at least one radio bearer. In an implementation, each protocol entity corresponds to at least two radio bearers, and the first network device sends a data packet of an MBMS service to the terminal device through the at least two radio bearers. The at least two radio bearers may be unicast radio bearers or multicast radio bearers, or a part of the at least two radio bearers may be unicast radio bearers and a part of the at least two radio bearers may be multicast radio bearers.

The first protocol layer of the first network device needs to set a sequence number of a first protocol layer for each data packet of the MBMS service, so that the terminal device processes the received data packet based on the sequence number of the first protocol layer. In a possible implementation, the sequence number of the first protocol layer may be placed in a header of the data packet.

Optionally, the sequence number of the first protocol layer is set based on a first sequence number in the first indication information, where the first sequence number is set by the core network device or a data server.

In a possible implementation, the sequence number of the first protocol layer is the same as the first sequence number. In other words, the first network device sets the first sequence number in the first indication information to the sequence number of the first protocol layer of the first data packet. Specifically, the first network device receives the first indication information sent by the core network device, where the first indication information includes the first sequence number (for example, a general packet radio service tunneling protocol-user plane (GPRS Tunneling Protocol-U, GTP-U) sequence number or another sequence number), and the first network device sets the first sequence number to the sequence number of the first protocol layer of the first data packet. For example, if the GTP-U sequence number of the first data packet received by the first network device from the core network device is 3, and GTP-U sequence numbers of different data packets sent by the core network device are different, the first network device also sets the sequence number of the first protocol layer to 3 for setting the sequence number of the first protocol layer for the first data packet at the first protocol layer.

Specifically, when the core network device sends at least one data packet of a first service to the first network device, the core network device may transmit the first indication information to facilitate the first network device to learn of sending progress of the first service. The first indication information may be implemented by setting the first sequence number for the data packet. When sending, to different first network devices, data packets received from the data server, the core network device enables same data packets (carrying same content or payloads) to carry same first sequence numbers, namely, same first indication information, where the first indication information identifies a position of the data packet in the at least one sent data packet.

Optionally, the first indication information includes at least one of the following information: the GTP-U sequence number and a first service sequence number. The first service sequence number is set by the core network device or the data server. The first data packet is a data packet of the first service, and the at least one data packet is a data packet of the first service.

The following uses the GTP-U sequence number as an example for brief description. Currently, during data transmission between the core network device and the first network device, the core network device establishes different PDU sessions or GTP tunnels with different first network devices for separate operation. Therefore, even if the core network device receives same data packets from the data server, the core network device may set different GTP-U sequence numbers when sending the same data packets to the different first network devices. However, in this application, the core network device sets, when sending same data packets received by the core network device from the data server or generated by the core network device to the different first network devices, same GTP-U sequence numbers for the data packets. In a possible implementation, a GTP-U sequence number is set for each data packet based on indication information of the data server. In this way, because the GTP-U sequence number is associated with content of the data packet, different first network devices can determine service transmission progress based on the GTP-U sequence number.

In a possible implementation, a difference between the sequence number of the first protocol layer and the first sequence number is a fixed value N. In other words, the first network device sets the sequence number of the first protocol layer of the first data packet by adding the fixed value N to the first sequence number in the first indication information or subtracting the fixed value N from the first sequence number in the first indication information. Specifically, the first network device receives the first indication information sent by the core network device, where the first indication information includes the first sequence number (for example, a GTP-U sequence number or another sequence number), and the first network device sets the sequence number of the first protocol layer of the first data packet by adding the fixed value N to the first sequence number or subtracting the fixed value N from the first sequence number. For example, if the GTP-U sequence number of the first data packet received by the first network device from the core network device is 3, N is 1, and GTP-U sequence numbers of different data packets sent by the core network device are different, the first network device sets the sequence number of the first protocol layer to 2 or 4 for setting the sequence number of the first protocol layer for the first data packet at the first protocol layer. N may be carried in the first indication information received by the first network device from the core network device, may be carried in other indication information, or may be pre-specified in a protocol.

Optionally, the first network device may alternatively set the sequence number of the first protocol layer of the first data packet by itself. For example, the first network device sets a sequence number of a first protocol layer of a $1^{st}$ data packet to 0, and sets a sequence number of a first protocol layer of a $2^{nd}$ data packet to 1, and sequence numbers of first protocol layers of subsequent data packets are increased successively.

S603. The first network device sends second indication information and/or third indication information to the terminal device, where the second indication information and/or the third indication information indicate/indicates a correspondence between the first protocol layer and the at least two radio bearers.

Specifically, when the first network device sends MBMS service data to the terminal device through different radio bearers, the terminal device needs to know which radio bearers are used to transmit same MBMS service data. Therefore, the first network device needs to configure the terminal device. A configuration method includes: The first network device sends the second indication information and/or the third indication information to the terminal device, where the second indication information and/or the third indication information indicate/indicates the correspondence between the first protocol layer and the at least two radio bearers.

Optionally, the second indication information includes configuration information of the first protocol layer of the terminal device. The second indication information includes at least one piece of first identification information, the at least one piece of first identification information one-to-one corresponds to the at least one radio bearer, and the at least one piece of first identification information includes at least one of the following: a radio bearer identifier, a PDCP layer identifier, an RLC layer identifier, and a logical channel identifier.

Optionally, the third indication information is for configuring a radio bearer, a PDCP layer, an RLC layer, or a logical channel of the terminal device, and the third indication information includes an identifier of the first protocol layer of the terminal device.

In a possible implementation, the first network device sends the second indication information to the terminal device. Optionally, the second indication information is carried in RRC signaling. The second indication information indicates a radio bearer associated with the first protocol layer of the terminal device, and includes the at least one piece of first identification information, the at least one piece of first identification information one-to-one corresponds to the at least one radio bearer, and the at least one piece of first identification information includes at least one of the following: the radio bearer identifier, the PDCP layer identifier, the RLC layer identifier, and the logical channel identifier. After the terminal device receives the second indication information, the first protocol layer of the terminal device is configured based on the second indication information. For example, if the second indication information includes a first radio bearer identifier and a second radio bearer identifier, it indicates that data packets received by the terminal device from a first radio bearer and a second radio bearer belong to a same MBMS service, and all need to be processed at the first protocol layer of the terminal device. Optionally, the second indication information may further include a service identifier, where the service identifier indicates an MBMS service associated with the first protocol layer of the terminal device.

In a possible implementation, the first network device sends the third indication information to the terminal device. Optionally, the third indication information is carried in the RRC signaling. The third indication information is for configuring the radio bearer, the PDCP layer, the RLC layer, or the logical channel of the terminal device, and the third indication information includes the identifier of the first protocol layer of the terminal device, where the identifier of the first protocol layer indicates the first protocol layer associated with the radio bearer, the PDCP layer, the RLC layer, or the logical channel of the terminal device. For example, if both third indication information for configuring a first radio bearer of the terminal device and third indication information for configuring a second radio bearer of the terminal device include the identifier of the first protocol layer, it indicates that data packets received by the terminal device from the first radio bearer and the second radio bearer belong to a same MBMS service, and all need to be processed at the first protocol layer of the terminal device. Optionally, the third indication information may further include a service identifier, where the service identifier indicates an MBMS service associated with the radio bearer, the PDCP layer, the RLC layer, or the logical channel of the terminal device.

In a possible implementation, the first network device sends the second indication information and the third indication information to the terminal device.

S604. The first network device sends the first data packet to the terminal device.

The first network device may send the first data packet to the terminal device through a unicast radio bearer or a multicast radio bearer, and the first data packet includes the sequence number of the first protocol layer that is set by the first network device.

S605. The terminal device processes the first data packet based on the sequence number of the first protocol layer.

Specifically, the first protocol layer of the terminal device is configured to perform at least one of the following processing on the first data packet: reordering, duplicate detection, discarding, transferring to an upper layer, or feeding back reception (for example, feeding back whether the first data packet is successfully received) of the first data packet.

In a possible implementation, after receiving the first data packet, the terminal device obtains the sequence number of the first protocol layer of the first data packet, then orders the received data packets of the MBMS service based on the sequence number of the first protocol layer, and transfers the data packets to a higher protocol layer in sequence.

In a possible implementation, after receiving the first data packet, the terminal device obtains the sequence number of the first protocol layer of the first data packet, and then compares the sequence number of the first protocol layer of the first data packet with sequence numbers of first protocol layers of other received data packets of the MBMS service. If there are data packets with the same sequence number of the first protocol layer, other duplicated data packets in the data packets with the same sequence number are discarded to reserve one of the duplicated data packets. For reserving one of the duplicated data packets, a data packet received first or a data packet received last may be reserved. This is not limited herein.

In a possible implementation, after receiving the first data packet, the terminal device obtains the sequence number of the first protocol layer of the first data packet. If finding that a data packet with a sequence number of a first protocol layer is not successfully received, the terminal device sends the feedback information to the first network device, where the feedback information indicates that the data packet with the sequence number of the first protocol layer is not successfully received. The first network device may retransmit the data packet based on the feedback information. For example, if the terminal device receives data packets with sequence numbers of first protocol layers being 1 and 3, the terminal device may determine that a data packet with a sequence number of a first protocol layer being 2 is not successfully received, and therefore send the feedback information for the data packet with the sequence number of the first protocol layer being 2.

Optionally, when the first network device sends the MBMS service data to the terminal device through different radio bearers, different security processing (for example, processing performed using different keys and/or security algorithms) may be performed on data packets of a same MBMS service on the unicast radio bearer and the multicast radio bearer. Security processing on a data packet transmitted through a radio bearer is configured and performed at a corresponding PDCP layer. The security processing includes processing processes such as integrity protection, integrity verification, encryption, and decryption.

Optionally, the method further includes: The first network device sends a data packet at the first protocol layer to a target access network device, where the first network device is an access network device to which the terminal device belongs.

Specifically, when the terminal device is handed over from the first network device to the target access network device due to mobility, to ensure service transmission continuity, data forwarding needs to be performed between access network devices. The purpose of data forwarding is to forward, to the target access network device, data that has not been completely sent by the first network device to the terminal device, and then send, via the target access network device, the data to the terminal device handed over to the target access network device. During the data forwarding, the data packet at the first protocol layer of the first network device needs to be forwarded to the target access network device, and then the target access network device sends, to the terminal device through the unicast radio bearer, the data packet forwarded by the first network device.

In the foregoing method, when the first network device sends the MBMS service data to the terminal device through different radio bearers, the first network device first configures the terminal device. In this way, the terminal device can determine a radio bearer for transmitting same MBMS service data. For sending the first data packet to the terminal device, the first network device sets the sequence number of the first protocol layer of the first data packet, and then sends the first data packet to the terminal device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets. For example, in the case of duplicate reception, the terminal device may discard the duplicated data packet; in the case of out of order, the terminal device may reorder the data packets; and in the case of packet loss, the terminal device may send feedback information to a transmit end for retransmission. This ensures orderly processing of multicast services by setting the first protocol layer on the first network device and the terminal device, and improves communication efficiency.

Figure 7:
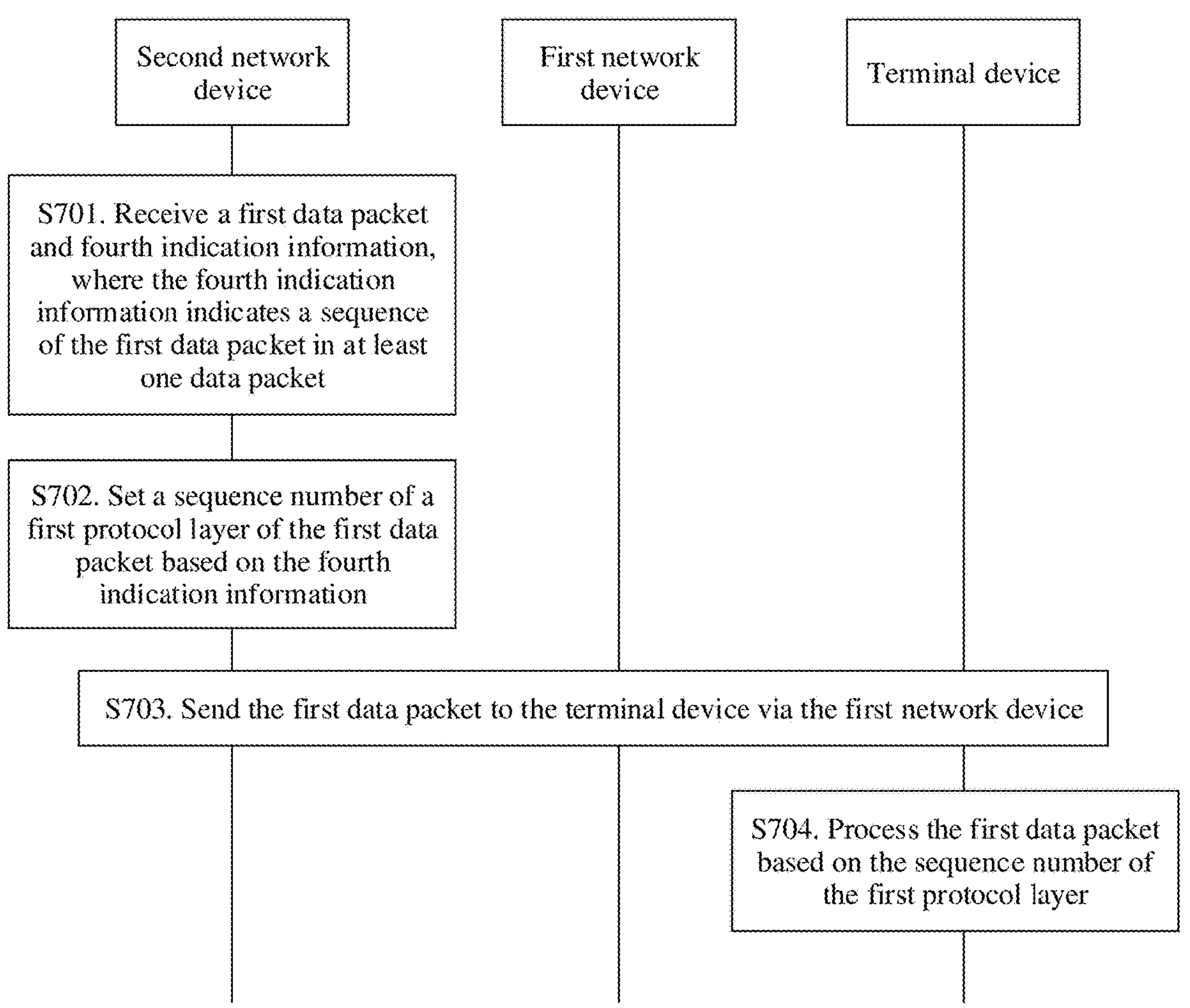
FIG. 7 is a schematic diagram of another multicast transmission method according to an embodiment of this application.

FIG. 7 is a schematic diagram of another multicast transmission method according to an embodiment of this application. As shown in FIG. 7, the multicast transmission method includes the following steps.

S701. A second network device receives a first data packet and fourth indication information, where the fourth indication information indicates a sequence of the first data packet in at least one data packet.

Optionally, the fourth indication information may be sent to the second network device together with the first data packet, for example, carried in the data packet or carried in a header of the data packet, or may be sent to the second network device separately from the first data packet. This is not limited herein.

Optionally, the second network device is a core network device, and the first data packet and the fourth indication information are sent by a data server to the second network device.

S702. The second network device sets a sequence number of a first protocol layer of the first data packet based on the fourth indication information.

This step may also be understood as that the second network device determines the sequence number of the first protocol layer of the first data packet based on the fourth indication information.

The first protocol layer is a protocol layer above a PDCP layer. Specifically, the first protocol layer may be an existing protocol layer (for example, a TCP layer/an IP layer) above the PDCP layer, or a newly designed protocol layer above the PDCP layer. This is not limited herein. The first protocol layer of the second network device is configured to implement at least one of the following functions during downlink transmission: adding a protocol layer header to a data packet, setting a sequence number of the first protocol layer for a data packet, receiving feedback information, segmenting or concatenating a data packet, retransmitting a data packet, and the like.

Optionally, each protocol entity of the first protocol layer is associated with at least one radio bearer. In an implementation, each protocol entity corresponds to at least two radio bearers. The at least two radio bearers may be unicast radio bearers or multicast radio bearers, or a part of the at least two radio bearers may be unicast radio bearers and a part of the at least two radio bearers may be multicast radio bearers.

Optionally, the sequence number of the first protocol layer is set based on a second sequence number in the fourth indication information, where the second sequence number is set by the data server.

In a possible implementation, the sequence number of the first protocol layer is the same as the second sequence number. In other words, the second network device sets the second sequence number in the fourth indication information to the sequence number of the first protocol layer of the first data packet.

In a possible implementation, a difference between the sequence number of the first protocol layer and the second sequence number is a fixed value N. In other words, the second network device sets the sequence number of the first protocol layer of the first data packet by adding the fixed value N to the second sequence number in the fourth indication information or subtracting the fixed value N from the second sequence number in the fourth indication information. The fixed value N is specified in a protocol or received by the second network device from another network device (for example, the data server).

Optionally, the second network device may alternatively set the sequence number of the first protocol layer of the first data packet by itself. For example, after a first protocol layer entity is established, a sequence number of a data packet in the first protocol layer entity is set to 0 or 1, and is increased successively.

S703. The second network device sends the first data packet to a terminal device via a first network device.

Specifically, after being processed by the first protocol layer of the second network device, the first data packet is transmitted to the first network device through a transmission channel (for example, a PDU session or a QoS flow) between the second network device and the first network device. The first network device transmits the first data packet to the terminal device through at least two radio bearers.

S704. The terminal device processes the first data packet based on the sequence number of the first protocol layer.

Specifically, the first protocol layer of the terminal device is configured to perform at least one of the following processing on the first data packet: reordering, duplicate detection, discarding, transferring to an upper layer, or feeding back reception (for example, feeding back whether the first data packet is successfully received) of the first data packet.

In the foregoing method, for sending the first data packet to the terminal device, the second network device sets the sequence number of the first protocol layer of the first data packet, and then sends the first data packet to the terminal device via the first network device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets. For example, in the case of duplicate reception, the terminal device may discard the duplicated data packet; in the case of out of order, the terminal device may reorder the data packets; and in the case of packet loss, the terminal device may send feedback information to a transmit end for retransmission. This ensures orderly processing of multicast services by setting the first protocol layer on the second network device and the terminal device, and improves communication efficiency.

Figure 8:
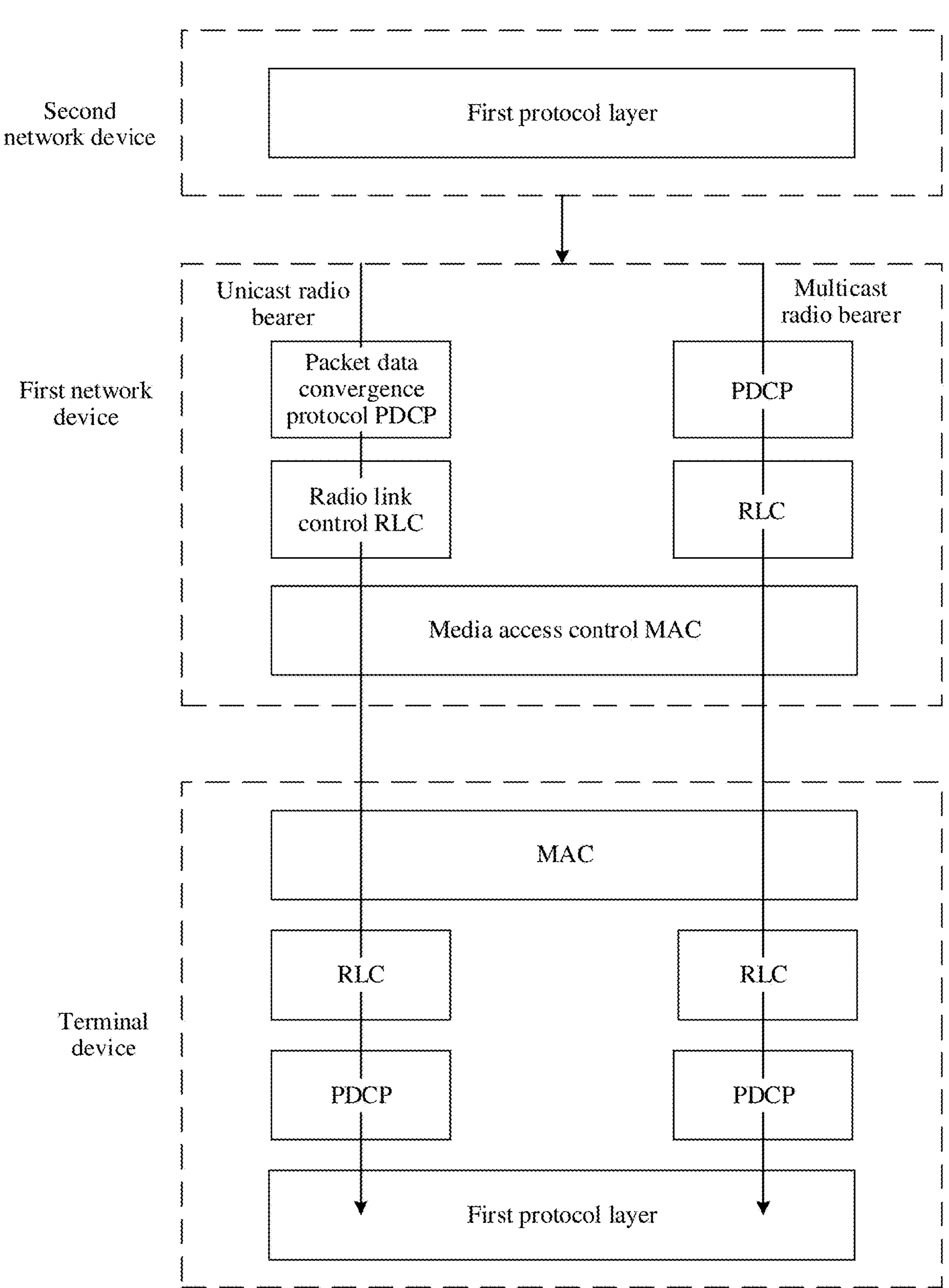
FIG. 8 is a schematic diagram in which a second network device sends MBMS service data to a terminal device in FIG. 7.

FIG. 8 is a schematic diagram in which a second network device sends MBMS service data to a terminal device in FIG. 7. As shown in FIG. 8, a first protocol layer is set on the second network device and the terminal device. The first protocol layer may be an existing protocol layer (for example, a TCP layer/an IP layer) above a PDCP layer, or a newly designed protocol layer above the PDCP layer. This is not limited herein.

After being processed by the first protocol layer of the second network device, a first data packet is transmitted to a first network device through a transmission channel (for example, a PDU session or a QoS flow) between the second network device and the first network device. The first network device transmits the first data packet to the terminal device through at least two radio bearers. The terminal device may receive, through a unicast radio bearer or a multicast radio bearer, a data packet of an MBMS service. After the first protocol layer is set on the second network device and the terminal device, the first protocol layer of the second network device may be configured to set a sequence number of a first protocol layer of a data packet, receive feedback information, segment or concatenate a data packet, and/or retransmit a data packet. The first protocol layer of the terminal device may be configured to perform at least one of the following processing on a data packet: reordering, duplicate detection, discarding, transferring to an upper layer, and feeding back reception of a data packet. In this way, when the second network device sends the MBMS service data to the terminal device, the second network device may process, at the first protocol layer, the data packet of the MBMS service; and the terminal device may process, at the first protocol layer, the data packet of the MBMS service received through the unicast radio bearer or the multicast radio bearer. This ensures that the terminal device can correctly process the data packet of the MBMS service received through different radio bearers, and ensures that data packets are delivered to an upper layer in order, without duplication, and without packet loss.

Figure 9:
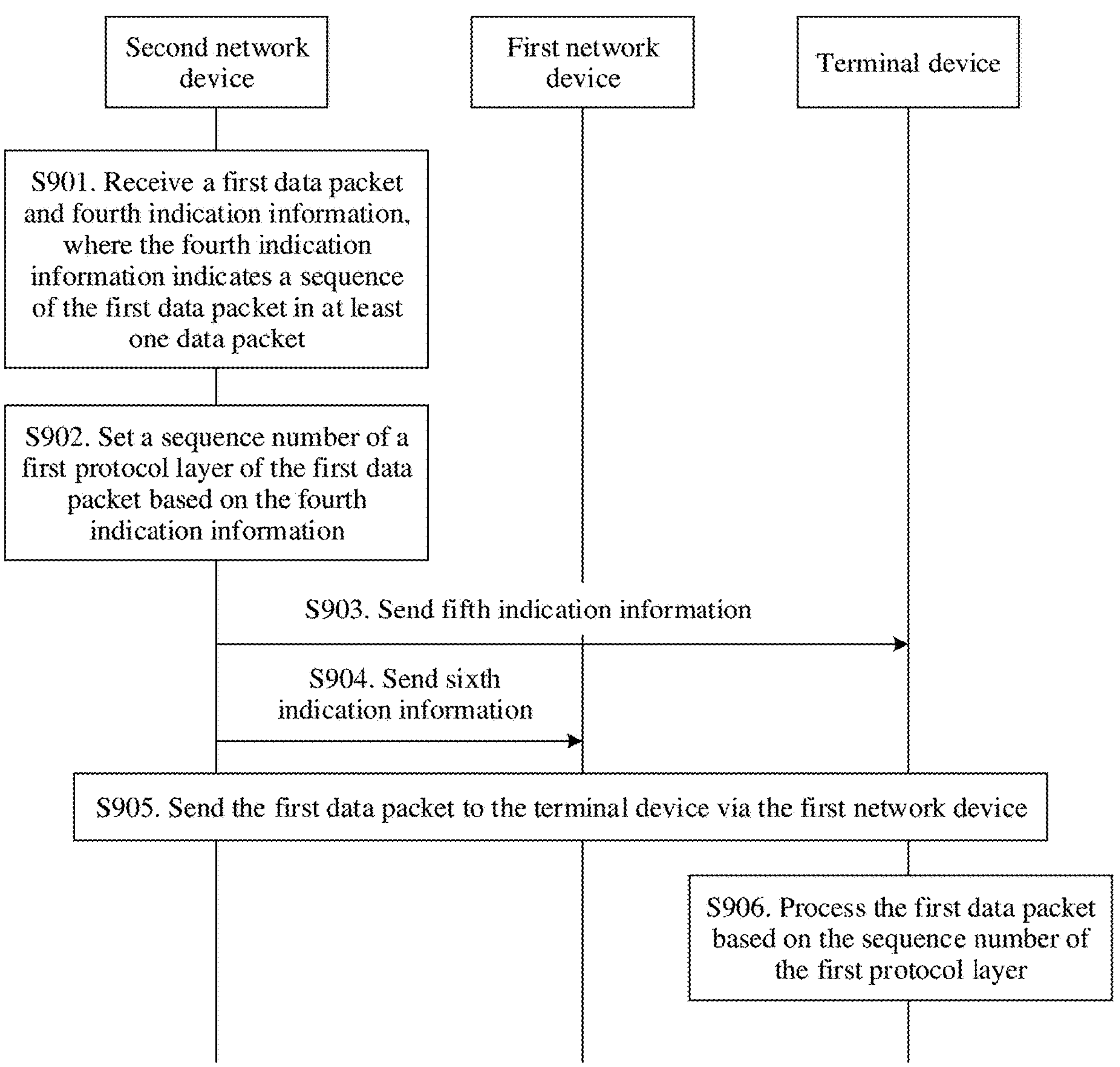
FIG. 9 is a schematic diagram of another multicast transmission method according to an embodiment of this application.

FIG. 9 is a schematic diagram of another multicast transmission method according to an embodiment of this application. As shown in FIG. 9, the multicast transmission method includes the following steps.

S901. A second network device receives a first data packet and fourth indication information, where the fourth indication information indicates a sequence of the first data packet in at least one data packet.

Optionally, the fourth indication information may be sent to the second network device together with the first data packet, for example, carried in the data packet or carried in a header of the data packet, or may be sent to the second network device separately from the first data packet. This is not limited herein.

Optionally, the second network device is a core network device, and the first data packet and the fourth indication information are sent by a data server to the second network device.

S902. The second network device sets a sequence number of a first protocol layer of the first data packet based on the fourth indication information.

This step may also be understood as that the second network device determines the sequence number of the first protocol layer of the first data packet based on the fourth indication information.

The first protocol layer is a protocol layer above a PDCP layer. Specifically, the first protocol layer may be an existing protocol layer (for example, a TCP layer/an IP layer) above the PDCP layer, or a newly designed protocol layer above the PDCP layer. This is not limited herein. The first protocol layer of the second network device is configured to implement at least one of the following functions during downlink transmission: adding a protocol layer header to a data packet, setting a sequence number of the first protocol layer for a data packet, receiving feedback information, segmenting or concatenating a data packet, retransmitting a data packet, and the like.

Optionally, each protocol entity of the first protocol layer is associated with at least one radio bearer. In an implementation, each protocol entity corresponds to at least two radio bearers. The at least two radio bearers may be unicast radio bearers or multicast radio bearers, or a part of the at least two radio bearers may be unicast radio bearers and a part of the at least two radio bearers may be multicast radio bearers.

The first protocol layer of the second network device needs to set a sequence number of a first protocol layer for each data packet of an MBMS service, so that a terminal device processes the received data packet based on the sequence number of the first protocol layer. In a possible implementation, the sequence number of the first protocol layer may be placed in a header of the data packet.

Optionally, the sequence number of the first protocol layer is set based on a second sequence number in the fourth indication information, where the second sequence number is set by the data server.

In a possible implementation, the sequence number of the first protocol layer is the same as the second sequence number. In other words, the second network device sets the second sequence number in the fourth indication information to the sequence number of the first protocol layer of the first data packet. Specifically, the second network device receives the fourth indication information sent by the data server, where the fourth indication information includes the second sequence number, and the second network device sets the second sequence number to the sequence number of the first protocol layer of the first data packet. For example, if the second sequence number of the first data packet received by the second network device from the data server is 3, the second network device also sets the sequence number of the first protocol layer to 3 for setting the sequence number of the first protocol layer for the first data packet at the first protocol layer.

In a possible implementation, a difference between the sequence number of the first protocol layer and the second sequence number is a fixed value N. In other words, the second network device sets the sequence number of the first protocol layer of the first data packet by adding the fixed value N to the second sequence number in the fourth indication information or subtracting the fixed value N from the second sequence number in the fourth indication information. Specifically, the second network device receives the fourth indication information sent by the data server, where the fourth indication information includes the second sequence number, and the second network device sets the sequence number of the first protocol layer of the first data packet by adding the fixed value N to the second sequence number or subtracting the fixed value N from the second sequence number. For example, if the second sequence number of the first data packet received by the second network device from the data server is 3, and N is 1, the second network device sets the sequence number of the first protocol layer to 2 or 4 for setting the sequence number of the first protocol layer for the first data packet at the first protocol layer. N may be carried in the fourth indication information received by the second network device from the data server, may be carried in other indication information, or may be pre-specified in a protocol.

Optionally, the second network device may alternatively set the sequence number of the first protocol layer of the first data packet by itself. For example, the second network device sets a sequence number of a first protocol layer of a 1st data packet to 0, and sets a sequence number of a first protocol layer of a 2nd data packet to 1, and sequence numbers of first protocol layers of subsequent data packets are increased successively.

S903. The second network device sends fifth indication information to the terminal device.

Specifically, when MBMS service data is sent to the terminal device through different radio bearers, the terminal device needs to know which radio bearers are used to transmit same MBMS service data. Therefore, the second network device needs to configure the terminal device. A configuration method includes: The second network device sends the fifth indication information to the terminal device.

Optionally, the fifth indication information includes configuration information of the first protocol layer of the terminal device. The fifth indication information includes at least one piece of second identification information, and the at least one piece of second identification information includes at least one of the following: a transmission channel identifier, an identifier of the first protocol layer of the terminal device, and a service identifier of the first data packet.

In a possible implementation, the second network device sends the fifth indication information to the terminal device. Optionally, the fifth indication information is carried in a non-access stratum (NAS) signaling. The fifth indication information includes the at least one piece of second identification information, and the at least one piece of second identification information includes at least one of the following: the transmission channel identifier, the identifier of the first protocol layer of the terminal device, and the service identifier of the first data packet. After the terminal device receives the fifth indication information, the first protocol layer of the terminal device is configured based on the fifth indication information, and the terminal device may obtain the identifier of the first protocol layer, the transmission channel identifier associated with the first protocol layer, or the service identifier associated with the first protocol layer.

Optionally, the fifth indication information includes the configuration information of the first protocol layer of the terminal device. The fifth indication information includes a radio bearer identifier. The fifth indication information indicates a radio bearer associated with the first protocol layer of the terminal device. After the terminal device receives the fifth indication information, the first protocol layer of the terminal device is configured based on the fifth indication information. For example, if the fifth indication information includes a first radio bearer identifier and a second radio bearer identifier, it indicates that data packets received by the terminal device from a first radio bearer and a second radio bearer belong to a same MBMS service, and all need to be processed at the first protocol layer of the terminal device.

S904. The second network device sends sixth indication information to a first network device.

Optionally, the sixth indication information is for configuring a radio bearer, a PDCP layer, an RLC layer, or a logical channel of the terminal device, and the sixth indication information includes the at least one piece of second identification information. The fifth indication information and the sixth indication information indicate a correspondence between the first protocol layer and at least two radio bearers.

In a possible implementation, the second network device sends the sixth indication information to the first network device, where the sixth indication information includes the at least one piece of second identification information, and the at least one piece of second identification information includes at least one of the following: the transmission channel identifier, the identifier of the first protocol layer of the terminal device, and the service identifier of the first data packet. After receiving the sixth indication information, the first network device configures the radio bearer, the PDCP layer, the RLC layer, or the logical channel of the terminal device based on the sixth indication information. The transmission channel identifier indicates a transmission channel associated with the radio bearer, the PDCP layer, the RLC layer, or the logical channel of the terminal device. The identifier of the first protocol layer of the terminal device indicates a first protocol layer associated with the radio bearer, the PDCP layer, the RLC layer, or the logical channel of the terminal device. The service identifier of the first data packet indicates a service associated with the radio bearer, the PDCP layer, the RLC layer, or the logical channel of the terminal device. For example, if the first protocol layer of the terminal device is associated with a first transmission channel, and the first radio bearer and the second radio bearer of the terminal device are associated with the first transmission channel, it indicates that the data packets received by the terminal device from the first radio bearer and the second radio bearer belong to the same MBMS service, and all need to be processed at the first protocol layer of the terminal device.

S905. The second network device sends the first data packet to the terminal device via the first network device.

Specifically, after being processed by the first protocol layer of the second network device, the first data packet is transmitted to the first network device through a transmission channel (for example, a PDU session or a QoS flow) between the second network device and the first network device. When the transmission channel between the second network device and the first network device is being established, the second network device establishes a transmission channel associated with the first protocol layer. After being processed by the first protocol layer of the second network device, the data packet of the MBMS service is sent to the first network device through the associated transmission channel. After the transmission channel is established, the first network device establishes an associated radio bearer based on configuration information that is of the transmission channel and that is sent by the second network device or QoS information that corresponds to the transmission channel and that is sent by the second network device, to transmit the data packet sent through the transmission channel. The first network device transmits the first data packet to the terminal device through the at least two radio bearers.

S906. The terminal device processes the first data packet based on the sequence number of the first protocol layer.

Specifically, the first protocol layer of the terminal device is configured to perform at least one of the following processing on the first data packet: reordering, duplicate detection, discarding, transferring to an upper layer, or feeding back reception (for example, feeding back whether the first data packet is successfully received) of the first data packet.

In a possible implementation, after receiving the first data packet, the terminal device obtains the sequence number of the first protocol layer of the first data packet, then orders the received data packets of the MBMS service based on the sequence number of the first protocol layer, and transfers the data packets to a higher protocol layer in sequence.

In a possible implementation, after receiving the first data packet, the terminal device obtains the sequence number of the first protocol layer of the first data packet, and then compares the sequence number of the first protocol layer of the first data packet with sequence numbers of first protocol layers of other received data packets of the MBMS service. If there are data packets with the same sequence number of the first protocol layer, other duplicated data packets in the data packets with the same sequence number are discarded to reserve one of the duplicated data packets. For reserving one of the duplicated data packets, a data packet received first or a data packet received last may be reserved. This is not limited herein.

In a possible implementation, after receiving the first data packet, the terminal device obtains the sequence number of the first protocol layer of the first data packet. If finding that a data packet with a sequence number of a first protocol layer is not successfully received, the terminal device sends the feedback information to the first network device, where the feedback information indicates that the data packet with the sequence number of the first protocol layer is not successfully received. The first network device may retransmit the data packet based on the feedback information. For example, if the terminal device receives data packets with sequence numbers of first protocol layers being 1 and 3, the terminal device may determine that a data packet with a sequence number of a first protocol layer being 2 is not successfully received, and therefore send the feedback information for the data packet with the sequence number of the first protocol layer being 2.

Optionally, when the first network device sends the MBMS service data to the terminal device through different radio bearers, different security processing (for example, processing performed using different keys and/or security algorithms) may be performed on data packets of a same MBMS service on the unicast radio bearer and the multicast radio bearer. Security processing on a data packet transmitted through a radio bearer is configured and performed at a corresponding PDCP layer. The security processing includes processing processes such as integrity protection, integrity verification, encryption, and decryption.

In the foregoing method, when sending the MBMS service data to the terminal device through different radio bearers, the second network device first configures the terminal device. In this way, the terminal device can determine a radio bearer for transmitting the same MBMS service data. For sending the first data packet to the terminal device, the second network device sets the sequence number of the first protocol layer of the first data packet, and then sends the first data packet to the terminal device via the first network device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets. For example, in the case of duplicate reception, the terminal device may discard the duplicated data packet; in the case of out of order, the terminal device may reorder the data packets; and in the case of packet loss, the terminal device may send feedback information to a transmit end for retransmission. This ensures orderly processing of multicast services by setting the first protocol layer on the second network device and the terminal device, and improves communication efficiency.

The following describes a service transmission process. A service comes from a data server. First, the data server sends service data to a second network device (a core network device), then the second network device sends the service data to a first network device (an access network device) using a PDU session or a QoS flow, and finally the first network device sends the service data to a terminal device through a radio bearer.

For unicast service transmission, one PDU session between the second network device and the first network device may include at least one QoS flow of a unicast service, and each PDU session corresponds to one SDAP. The SDAP is responsible for mapping a plurality of QoS flows in one PDU session to at least one radio bearer. One QoS flow may be mapped only to one radio bearer, and a plurality of QoS flows may be mapped to a same radio bearer. After the mapping is completed, data in the QoS flow may be transmitted through the mapped radio bearer.

For multicast service transmission, an embodiment of this application provides a method for mapping a QoS flow of a multicast service to a radio bearer.

In a possible implementation, for a specific QoS flow, when establishing a PDU session or a QoS flow, a second network device may send indication information to a first network device, where the indication information indicates that a type of the QoS flow is a multicast QoS flow or a unicast QoS flow. The multicast QoS flow is used to transmit an MBMS service. On the first network device side, the first network device receives the indication information, and an SDAP maps a QoS flow of a multicast service to a multicast radio bearer. When the SDAP maps the QoS flow of the multicast service, only one-to-one mapping to the multicast radio bearer may be performed, which means that only one QoS flow of the multicast service may be mapped to one radio bearer. In this case, when a data packet of the multicast service is transmitted through the radio bearer, an SDAP header may not need to be added or a QoS flow ID may not need to be carried in a header.

The reason for only one-to-one mapping is that the multicast radio bearer transmits the multicast service to a specific group of terminal devices, and different multicast radio bearers may be specific for different terminal device groups. In addition, a unicast radio bearer is specific for one terminal device. Therefore, the QoS flow of the multicast service may be separately mapped to one multicast radio bearer, and cannot be mapped to a same radio bearer together with another QoS flow.

In another possible implementation, for a specific QoS flow, when establishing a PDU session or a QoS flow, a second network device may send indication information to a first network device, where the indication information indicates that a type of the QoS flow is a multicast QoS flow or a unicast QoS flow. On the first network device side, after receiving the indication information indicating the multicast QoS flow, the first network device may establish a separate radio bearer for the multicast QoS flow to transmit an MBMS service. Configuration information of the radio bearer may include an identifier of the PDU session or an identifier of the QoS flow. In this implementation, a protocol stack for transmitting the MBMS service does not include an SDAP protocol layer, the separate radio bearer may be established for the multicast QoS flow, without requiring mapping the multicast QoS flow to the radio bearer by the SDAP protocol layer.

In the foregoing two possible implementations, a QoS flow of a unicast service and a QoS flow of a multicast service may be transmitted in a same PDU session. For example, a multicast QoS flow 1 and a unicast QoS flow 2 are transmitted in a same PDU session. Alternatively, only a QoS flow of a multicast service may be transmitted in a same PDU session. For example, a multicast QoS flow 1 and a multicast QoS flow 2 are transmitted in a same PDU session, and a unicast QoS flow 1 and a unicast QoS flow 2 are transmitted in a same PDU session. Alternatively, a QoS flow of each multicast service may be separately transmitted in one PDU session. This is not limited herein.

The foregoing describes the multicast transmission method provided in embodiments of this application, and the following describes the communication apparatuses provided in embodiments of this application.

Figure 10:
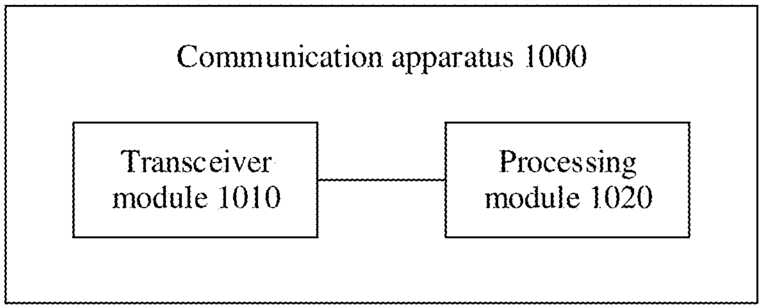
FIG. 10 is a schematic diagram of a communication apparatus 1000 according to an embodiment of this application.

FIG. 10 is a schematic diagram of a communication apparatus 1000 according to an embodiment of this application. The communication apparatus 1000 is used in a first network device and includes a transceiver module 1010 and a processing module 1020. The communication apparatus 1000 may be the first network device, or may be a chip or an integrated circuit inside the first network device.

The transceiver module 1010 is configured to receive a first data packet and first indication information, where the first indication information indicates a sequence of the first data packet in at least one data packet.

The processing module 1020 is configured to set a sequence number of a first protocol layer of the first data packet based on the first indication information.

The transceiver module 1010 is further configured to send the first data packet to a terminal device.

In this embodiment of this application, for sending the first data packet to the terminal device, the first network device sets the sequence number of the first protocol layer of the first data packet, and then sends the first data packet to the terminal device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets, to improve communication efficiency.

Optionally, in an embodiment, the sequence number of the first protocol layer is set based on a first sequence number in the first indication information.

Optionally, in an embodiment, the sequence number of the first protocol layer is the same as the first sequence number, or a difference between the sequence number of the first protocol layer and the first sequence number is a fixed value N.

Optionally, in an embodiment, the first protocol layer corresponds to at least two radio bearers.

Optionally, in an embodiment, the transceiver module 1010 is further configured to send second indication information and/or third indication information to the terminal device, where the second indication information and/or the third indication information indicate/indicates a correspondence between the first protocol layer and the at least two radio bearers.

Optionally, in an embodiment, the second indication information includes configuration information of the first protocol layer of the terminal device.

Optionally, in an embodiment, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

Optionally, in an embodiment, the third indication information is for configuring a radio bearer, a PDCP layer, an RLC layer, or a logical channel of the terminal device, and the third indication information includes an identifier of the first protocol layer of the terminal device.

Optionally, in an embodiment, the transceiver module 1010 is further configured to send a data packet at the first protocol layer to a target access network device, where the first network device is an access network device to which the terminal device belongs.

It should be understood that the processing module 1020 in this embodiment of this application may be implemented by a processor or a processor-related circuit component, and the transceiver module 1010 may be implemented by a transceiver or a transceiver-related circuit component.

Figure 11:
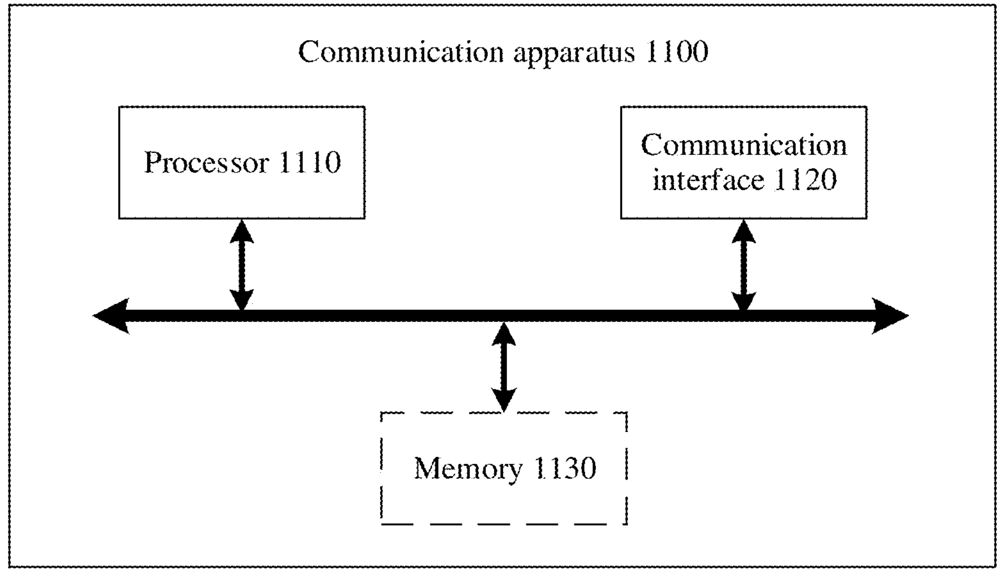
FIG. 11 is a schematic diagram of another communication apparatus 1100 according to an embodiment of this application.

FIG. 11 is a schematic diagram of another communication apparatus 1100 according to an embodiment of this application. The communication apparatus 1100 includes a processor 1110 and a communication interface 1120, and optionally further includes a memory 1130. The communication apparatus 1100 may be a first network device, or may be a chip or an integrated circuit inside the first network device. The processor 1110, the communication interface 1120, and the memory 1130 are connected through a bus. The memory 1130 stores instructions or a program. The processor 1110 is configured to execute the instructions or the program stored in the memory 1130. When the instructions or the program stored in the memory 1130 is executed, the processor 1110 is configured to perform an operation performed by the processing module 1020 in the foregoing embodiment, and the communication interface 1120 is configured to perform an operation performed by the transceiver module 1010 in the foregoing embodiment.

It should be understood that the communication apparatus 1000 or the communication apparatus 1100 in embodiments of this application may correspond to the first network device in the multicast transmission method in embodiments of this application, and operations and/or functions of modules in the communication apparatus 1000 or the communication apparatus 1100 are separately used to implement corresponding procedures in the methods in FIG. 4 to FIG. 6. For brevity, details are not described herein again.

Figure 12:
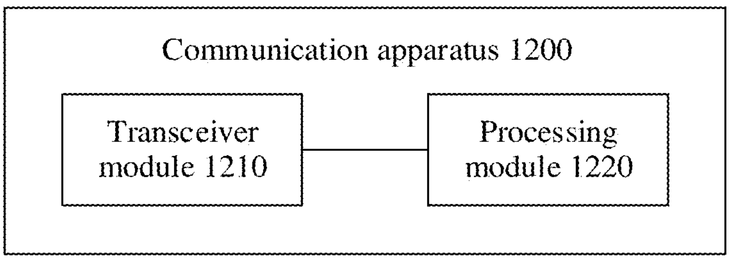
FIG. 12 is a schematic diagram of a communication apparatus 1200 according to an embodiment of this application.

FIG. 12 is a schematic diagram of a communication apparatus 1200 according to an embodiment of this application. The communication apparatus 1200 is used in a terminal device and includes a transceiver module 1210 and a processing module 1220. The communication apparatus 1200 may be the terminal device, or may be a chip or an integrated circuit inside the terminal device.

The transceiver module 1210 is configured to receive a first data packet, where a sequence number of a first protocol layer of the first data packet is set based on first indication information, and the first indication information indicates a sequence of the first data packet in at least one data packet.

The processing module 1220 is configured to process the first data packet based on the sequence number of the first protocol layer.

In this embodiment of this application, the terminal device receives the first data packet, where the first data packet includes the sequence number of the first protocol layer. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets, to improve communication efficiency.

Optionally, in an embodiment, the sequence number of the first protocol layer is set based on a first sequence number in the first indication information.

Optionally, in an embodiment, the sequence number of the first protocol layer is the same as the first sequence number, or a difference between the sequence number of the first protocol layer and the first sequence number is a fixed value N.

Optionally, in an embodiment, the first protocol layer corresponds to at least two radio bearers.

Optionally, in an embodiment, the transceiver module 1210 is further configured to receive second indication information and/or third indication information, where the second indication information and/or the third indication information indicate/indicates a correspondence between the first protocol layer and the at least two radio bearers.

Optionally, in an embodiment, the second indication information includes configuration information of the first protocol layer of the terminal device.

Optionally, in an embodiment, the second indication information includes at least one piece of first identification information, the at least one piece of first identification information one-to-one corresponds to at least one radio bearer, and the at least one piece of first identification information includes at least one of the following: a radio bearer identifier, a packet data convergence protocol PDCP layer identifier, a radio link control RLC layer identifier, and a logical channel identifier.

Optionally, in an embodiment, the third indication information is for configuring a radio bearer, a PDCP layer, an RLC layer, or a logical channel of the terminal device, and the third indication information includes an identifier of the first protocol layer of the terminal device.

Optionally, in an embodiment, the first protocol layer of the terminal device is configured to perform at least one of the following processing on the first data packet: reordering, duplicate detection, discarding, transferring to an upper layer, or feeding back for the first data packet.

Figure 13:
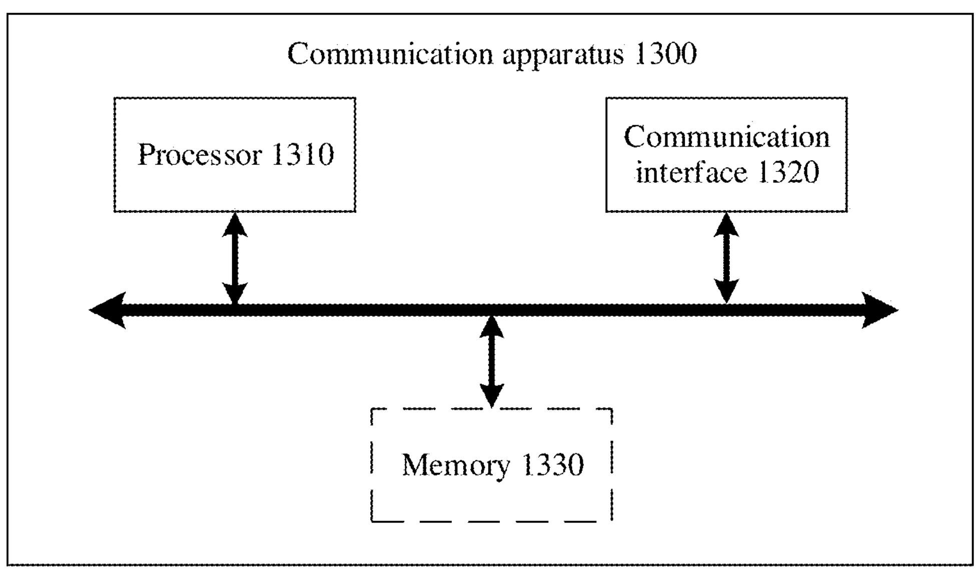
FIG. 13 is a schematic diagram of another communication apparatus 1300 according to an embodiment of this application.

FIG. 13 is a schematic diagram of another communication apparatus 1300 according to an embodiment of this application. The communication apparatus 1300 includes a processor 1310 and a communication interface 1320, and optionally further includes a memory 1330. The communication apparatus 1300 may be a terminal device, or may be a chip or an integrated circuit inside the terminal device. The processor 1310, the communication interface 1320, and the memory 1330 are connected through a bus. The memory 1330 stores instructions or a program. The processor 1310 is configured to execute the instructions or the program stored in the memory 1330. When the instructions or the program stored in the memory 1330 is executed, the processor 1310 is configured to perform an operation performed by the processing module 1220 in the foregoing embodiment, and the communication interface 1320 is configured to perform an operation performed by the transceiver module 1210 in the foregoing embodiment.

It should be understood that the communication apparatus 1200 or the communication apparatus 1300 in embodiments of this application may correspond to the terminal device in the multicast transmission method in embodiments of this application, and operations and/or functions of modules in the communication apparatus 1200 or the communication apparatus 1300 are separately used to implement corresponding procedures in the methods in FIG. 4 to FIG. 6. For brevity, details are not described herein again.

Figure 14:
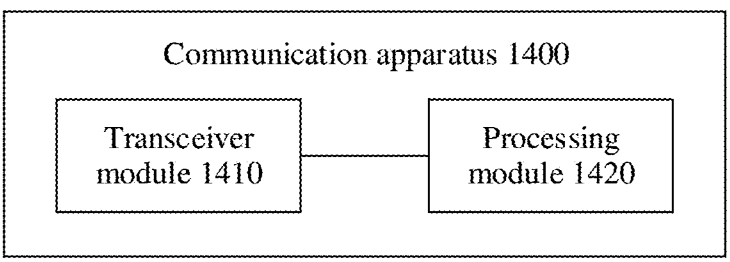
FIG. 14 is a schematic diagram of a communication apparatus 1400 according to an embodiment of this application.

FIG. 14 is a schematic diagram of a communication apparatus 1400 according to an embodiment of this application. The communication apparatus 1400 is used in a second network device and includes a transceiver module 1410 and a processing module 1420. The communication apparatus 1400 may be the second network device, or may be a chip or an integrated circuit inside the second network device.

The transceiver module 1410 is configured to receive a first data packet and fourth indication information, where the fourth indication information indicates a sequence of the first data packet in at least one data packet.

The processing module 1420 is configured to set a sequence number of a first protocol layer of the first data packet based on the fourth indication information.

The transceiver module 1410 is further configured to send the first data packet to a terminal device via a first network device.

In this embodiment of this application, for sending the first data packet to the terminal device, the second network device sets the sequence number of the first protocol layer of the first data packet, and then sends the first data packet to the terminal device via the first network device. In this way, all data packets received by the terminal device include corresponding sequence numbers of first protocol layers. Therefore, the terminal device may accordingly process the received data packets based on the sequence number of the first protocol layer in the case of duplication, out of order, packet lost, incorrect reception, or the like for the data packets, to improve communication efficiency.

Optionally, in an embodiment, the sequence number of the first protocol layer is set based on a first sequence number in the first indication information.

Optionally, in an embodiment, the sequence number of the first protocol layer is the same as the first sequence number, or a difference between the sequence number of the first protocol layer and the first sequence number is a fixed value N.

Optionally, in an embodiment, the first protocol layer corresponds to at least two radio bearers.

Optionally, in an embodiment, the transceiver module 1410 is further configured to: send fifth indication information to the terminal device; and send sixth indication information to the first network device, where the fifth indication information and the sixth indication information indicate a correspondence between the first protocol layer and the at least two radio bearers.

Optionally, in an embodiment, the fifth indication information includes configuration information of the first protocol layer of the terminal device.

Optionally, in an embodiment, the fifth indication information includes at least one piece of second identification information, and the at least one piece of second identification information includes at least one of the following: a transmission channel identifier, an identifier of the first protocol layer of the terminal device, and a service identifier of the first data packet.

Optionally, in an embodiment, the sixth indication information is for configuring a radio bearer, a PDCP layer, an RLC layer, or a logical channel of the terminal device, and the sixth indication information includes the at least one piece of second identification information.

It should be understood that the processing module 1420 in this embodiment of this application may be implemented by a processor or a processor-related circuit component, and the transceiver module 1410 may be implemented by a transceiver or a transceiver-related circuit component.

Figure 15:
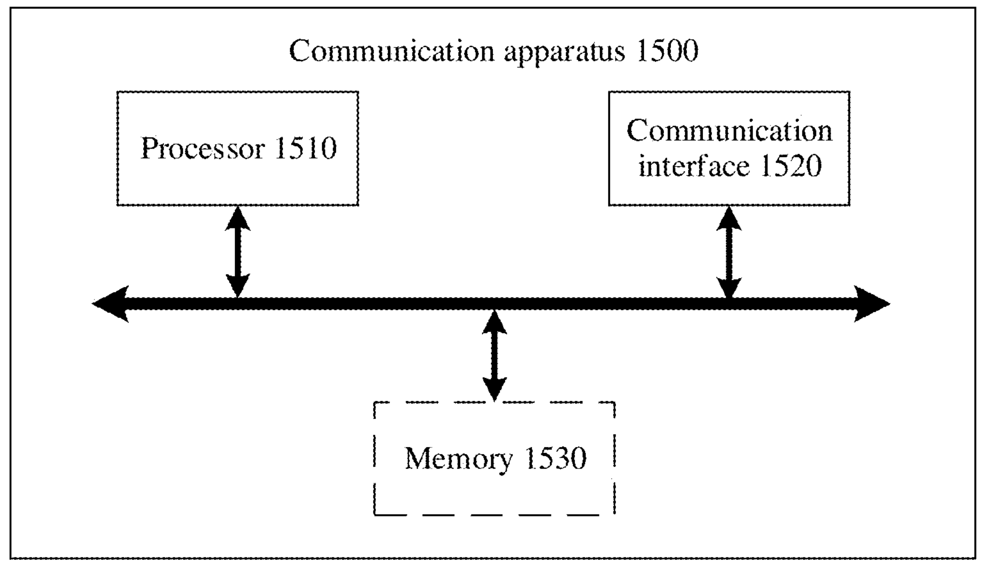
FIG. 15 is a schematic diagram of another communication apparatus 1500 according to an embodiment of this application.

FIG. 15 is a schematic diagram of another communication apparatus 1500 according to an embodiment of this application. The communication apparatus 1500 includes a processor 1510 and a communication interface 1520, and optionally further includes a memory 1530. The communication apparatus 1500 may be a second network device, or may be a chip or an integrated circuit inside the second network device. The processor 1510, the communication interface 1520, and the memory 1530 are connected through a bus. The memory 1530 stores instructions or a program. The processor 1510 is configured to execute the instructions or the program stored in the memory 1530. When the instructions or the program stored in the memory 1530 is executed, the processor 1510 is configured to perform an operation performed by the processing module 1420 in the foregoing embodiment, and the communication interface 1520 is configured to perform an operation performed by the transceiver module 1410 in the foregoing embodiment.

It should be understood that the communication apparatus 1400 or the communication apparatus 1500 in embodiments of this application may correspond to the second network device in the multicast transmission method in embodiments of this application, and operations and/or functions of modules in the communication apparatus 1400 or the communication apparatus 1500 are separately used to implement corresponding procedures in the methods in FIG. 7 to FIG. 9. For brevity, details are not described herein again.

Figure 16:
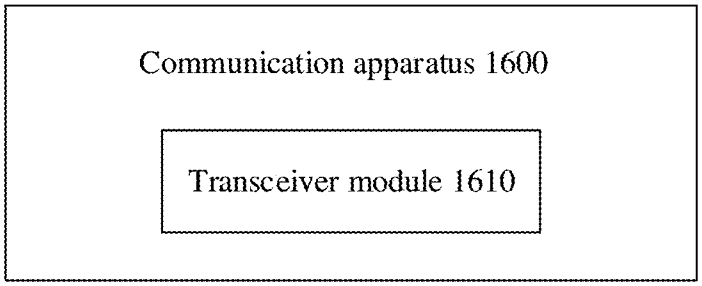
FIG. 16 is a schematic diagram of a communication apparatus 1600 according to an embodiment of this application.

FIG. 16 is a schematic diagram of a communication apparatus 1600 according to an embodiment of this application. The communication apparatus 1600 is used in a first network device and includes a transceiver module 1610. The communication apparatus 1600 may be the first network device, or may be a chip or an integrated circuit inside the first network device.

The transceiver module 1610 is configured to receive a first data packet, where a sequence number of a first protocol layer of the first data packet is set based on fourth indication information, and the fourth indication information indicates a sequence of the first data packet in at least one data packet.

The transceiver module 1610 is further configured to send the first data packet to a terminal device.

In this embodiment of this application, the first data packet received by the first network device includes the sequence number of the first protocol layer, and then the first network device sends the first data packet to the terminal device. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

Optionally, in an embodiment, the sequence number of the first protocol layer is set based on a second sequence number in the fourth indication information.

Optionally, in an embodiment, the sequence number of the first protocol layer is the same as the second sequence number, or a difference between the sequence number of the first protocol layer and the second sequence number is a fixed value N.

Optionally, in an embodiment, the first protocol layer corresponds to at least two radio bearers.

Optionally, in an embodiment, the transceiver module 1610 is further configured to receive sixth indication information, where the sixth indication information indicates a correspondence between the first protocol layer and the at least two radio bearers.

Optionally, in an embodiment, the sixth indication information is for configuring a radio bearer, a PDCP layer, an RLC layer, or a logical channel of the terminal device, the sixth indication information includes at least one piece of second identification information, and the at least one piece of second identification information includes at least one of the following: a transmission channel identifier, an identifier of the first protocol layer of the terminal device, and a service identifier of the first data packet.

It should be understood that the transceiver module 1610 in this embodiment of this application may be implemented by a transceiver or a transceiver-related circuit component.

Figure 17:
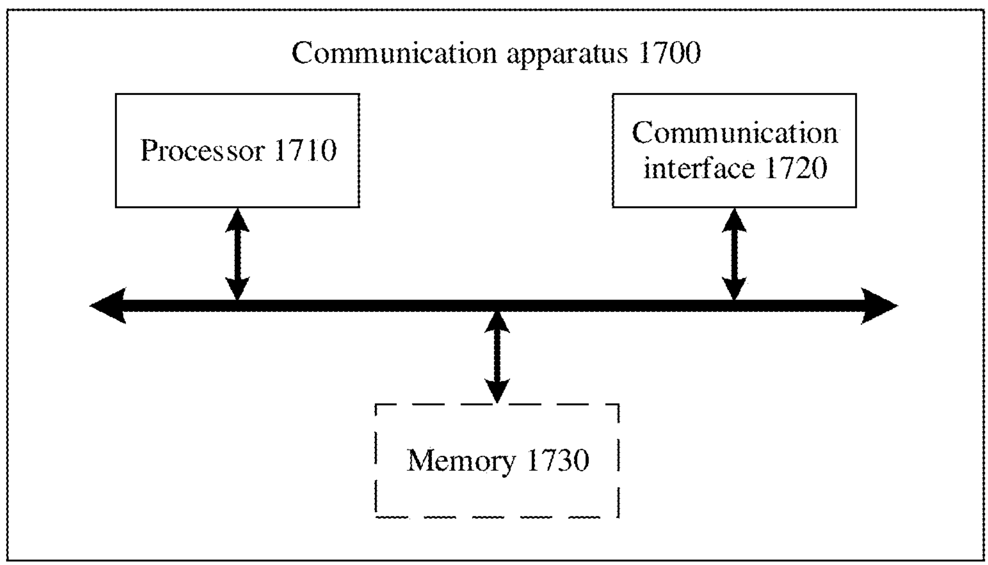
FIG. 17 is a schematic diagram of another communication apparatus 1700 according to an embodiment of this application.

FIG. 17 is a schematic diagram of another communication apparatus 1700 according to an embodiment of this application. The communication apparatus 1700 includes a processor 1710 and a communication interface 1720, and optionally further includes a memory 1730. The communication apparatus 1700 may be a first network device, or may be a chip or an integrated circuit inside the first network device. The processor 1710, the communication interface 1720, and the memory 1730 are connected through a bus. The memory 1730 stores instructions or a program. The processor 1710 is configured to execute the instructions or the program stored in the memory 1730. The communication interface 1720 is configured to perform an operation performed by the transceiver module 1610 in the foregoing embodiment.

It should be understood that the communication apparatus 1600 or the communication apparatus 1700 in embodiments of this application may correspond to the first network device in the multicast transmission method in embodiments of this application, and operations and/or functions of modules in the communication apparatus 1600 or the communication apparatus 1700 are separately used to implement corresponding procedures in the methods in FIG. 7 to FIG. 9. For brevity, details are not described herein again.

Figure 18:
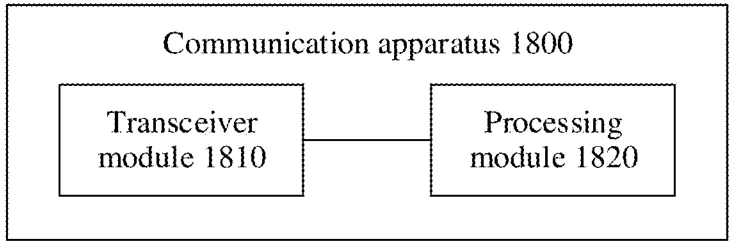
FIG. 18 is a schematic diagram of a communication apparatus 1800 according to an embodiment of this application.

FIG. 18 is a schematic diagram of a communication apparatus 1800 according to an embodiment of this application. The communication apparatus 1800 is used in a terminal device and includes a transceiver module 1810 and a processing module 1820. The communication apparatus 1800 may be the terminal device, or may be a chip or an integrated circuit inside the terminal device.

The transceiver module 1810 is configured to receive a first data packet, where a sequence number of a first protocol layer of the first data packet is set based on fourth indication information, and the fourth indication information indicates a sequence of the first data packet in at least one data packet.

The processing module 1820 is configured to process the first data packet based on the sequence number of the first protocol layer.

In this embodiment of this application, the terminal device receives the first data packet, where the first data packet includes the sequence number of the first protocol layer. In this way, all data packets received by the terminal device include corresponding sequence numbers of the first protocol layers. Therefore, the terminal device may accordingly process the received data packets based on the sequence number of the first protocol layer in the case of duplication, out of order, packet lost, incorrect reception, or the like for the received data packets, to improve communication efficiency.

Optionally, in an embodiment, the sequence number of the first protocol layer is set based on a second sequence number in the fourth indication information.

Optionally, in an embodiment, the sequence number of the first protocol layer is the same as the second sequence number, or a difference between the sequence number of the first protocol layer and the second sequence number is a fixed value N.

Optionally, in an embodiment, the first protocol layer corresponds to at least two radio bearers.

Optionally, in an embodiment, the transceiver module 1810 is further configured to receive fifth indication information, where the fifth indication information indicates a correspondence between the first protocol layer and the at least two radio bearers.

Optionally, in an embodiment, the fifth indication information includes configuration information of the first protocol layer of the terminal device.

Optionally, in an embodiment, the fifth indication information includes at least one piece of second identification information, and the at least one piece of second identification information includes at least one of the following: a transmission channel identifier, an identifier of the first protocol layer of the terminal device, and a service identifier of the first data packet.

Optionally, in an embodiment, the first protocol layer of the terminal device is configured to perform at least one of the following processing on the first data packet: reordering, duplicate detection, discarding, transferring to an upper layer, or feeding back for the first data packet.

Figure 19:
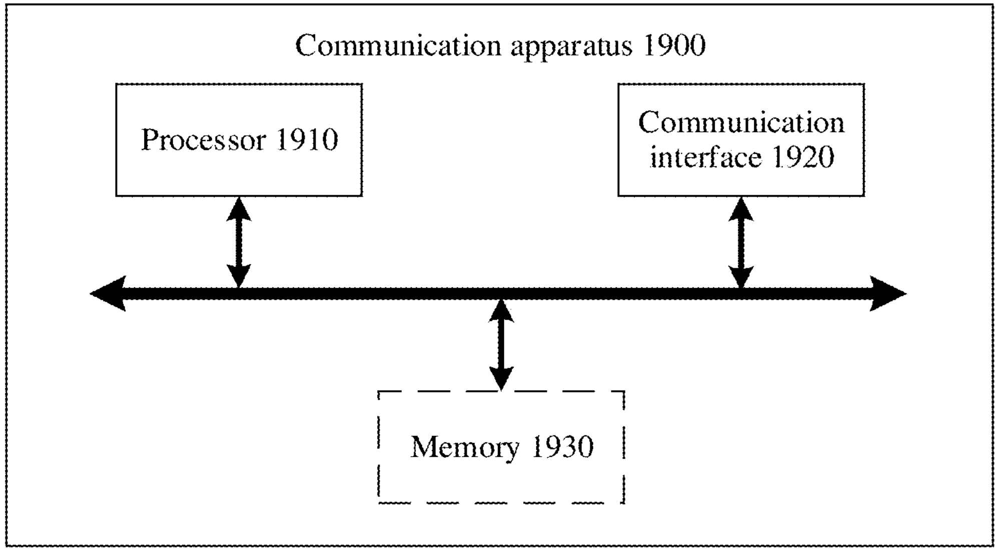
FIG. 19 is a schematic diagram of another communication apparatus 1900 according to an embodiment of this application.

FIG. 19 is a schematic diagram of another communication apparatus 1900 according to an embodiment of this application. The communication apparatus 1900 includes a processor 1910 and a communication interface 1920, and optionally further includes a memory 1930. The communication apparatus 1900 may be a terminal device, or may be a chip or an integrated circuit inside the terminal device. The processor 1910, the communication interface 1920, and the memory 1930 are connected through a bus. The memory 1930 stores instructions or a program. The processor 1910 is configured to execute the instructions or the program stored in the memory 1930. When the instructions or the program stored in the memory 1930 is executed, the processor 1910 is configured to perform an operation performed by the processing module 1820 in the foregoing embodiment, and the communication interface 1920 is configured to perform an operation performed by the transceiver module 1810 in the foregoing embodiment.

It should be understood that the communication apparatus 1800 or the communication apparatus 1900 in embodiments of this application may correspond to the terminal device in the multicast transmission method in embodiments of this application, and operations and/or functions of modules in the communication apparatus 1800 or the communication apparatus 1900 are separately used to implement corresponding procedures in the methods in FIG. 7 to FIG. 9. For brevity, details are not described herein again.

An embodiment of this application further provides a computer-readable storage medium. The computer-readable storage medium stores a computer program. When the program is executed by a processor, a procedure related to the first network device, the second network device, or the terminal device in the foregoing method embodiments may be implemented.

An embodiment of this application further provides a computer program product. When the computer program product runs on a computer or a processor, the computer or the processor is enabled to perform one or more steps in the foregoing method embodiments. When the foregoing modules in the device are implemented in a form of a software functional unit and sold or used as an independent product, the modules may be stored in the computer-readable storage medium.

An embodiment of this application further provides a communication system, including the first network device and the terminal device in the foregoing embodiments, or including the first network device, the second network device, and the terminal device in the foregoing embodiments.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The communication interface mentioned in embodiments of this application may be a wired communication interface, a wireless communication interface, or a combination thereof. The wired communication interface may be, for example, an Ethernet interface. The Ethernet interface may be an optical interface, an electrical interface, or a combination thereof. The wireless communication interface may be, for example, a WLAN interface.

It should be noted that, when the processor is a general purpose processor, a DSP, an ASIC, an FPGA or another programmable logic device, a discrete gate or transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium such as a USB flash drive, a removable hard disk, a read-only memory (ROM), a random access memory (RAM), a magnetic disk, or an optical disc, that can store program code.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multicast transmission method, comprising:

receiving, by a first network device, a first data packet and first indication information, wherein the first indication information indicates a sequence of the first data packet in at least one data packet;

setting, by the first network device, a sequence number of a first protocol layer of the first data packet based on the first indication information, wherein the first protocol layer is different from a packet data convergence protocol (PDCP) layer; and sending, by the first network device, the first data packet to a terminal device.

2. The multicast transmission method according to claim 1, wherein the sequence number of the first protocol layer is set based on a first sequence number in the first indication information.

3. The multicast transmission method according to claim 2, wherein the sequence number of the first protocol layer is the same as the first sequence number, or wherein a difference between the sequence number of the first protocol layer and the first sequence number is a fixed value (N).

4. The multicast transmission method according to claim 1, wherein the first protocol layer corresponds to at least two radio bearers.

5. The multicast transmission method according to claim 4, further comprising:

before the sending the first data packet to the terminal device:

sending second indication information or third indication information to the terminal device, wherein the second indication information or the third indication information indicates a correspondence between the first protocol layer and the at least two radio bearers.

6. The multicast transmission method according to claim 5, wherein the second indication information comprises configuration information of the first protocol layer of the terminal device.

7. The multicast transmission method according to claim 6, wherein the second indication information comprises at least one piece of first identification information, wherein the at least one piece of the first identification information has a one-to-one correspondence to at least one radio bearer, and wherein the at least one piece of the first identification information comprises at least one of: a radio bearer identifier, a PDCP layer identifier, a radio link control (RLC) layer identifier, or a logical channel identifier.

8. The multicast transmission method according to claim 5, wherein the third indication information configures a radio bearer, a PDCP layer, an RLC layer, or a logical channel of the terminal device, and wherein the third indication information comprises an identifier of the first protocol layer of the terminal device.

9. The multicast transmission method according to claim 1, further comprising:

sending a data packet at the first protocol layer to a target access network device, wherein the first network device is an access network device to which the terminal device belongs.

10. The method according to claim 1, wherein the first protocol layer is above the PDCP layer, wherein the sequence number of the first protocol layer is used by the terminal device for processing data packets received through both a unicast radio bearer and a multicast radio bearer for a same multimedia broadcast multicast service (MBMS), and wherein the processing includes at least one of: reordering, duplicate detection, discarding, transferring to an upper layer, or feeding back for the first data packet.

11. A multicast transmission method, comprising:

receiving, by a terminal device, a first data packet, wherein a sequence number of a first protocol layer of the first data packet is set based on first indication information, the first protocol layer is different from a packet data convergence protocol (PDCP) layer, and the first indication information indicates a sequence of the first data packet in at least one data packet; and processing, by the terminal device, the first data packet based on the sequence number of the first protocol layer.

12. The multicast transmission method according to claim 11, wherein the sequence number of the first protocol layer is set based on a first sequence number in the first indication information.

13. The multicast transmission method according to claim 12, wherein the sequence number of the first protocol layer is the same as the first sequence number, or wherein a difference between the sequence number of the first protocol layer and the first sequence number is a fixed value (N).

14. The multicast transmission method according to claim 11, wherein the first protocol layer corresponds to at least two radio bearers.

15. The multicast transmission method according to claim 14, further comprising:

before the receiving the first data packet:

receiving second indication information or third indication information, wherein the second indication information or the third indication information indicates a correspondence between the first protocol layer and the at least two radio bearers.

16. The multicast transmission method according to claim 15, wherein the second indication information comprises configuration information of the first protocol layer of the terminal device.

17. The multicast transmission method according to claim 16, wherein the second indication information comprises at least one piece of first identification information, wherein the at least one piece of the first identification information has a one-to-one correspondence to at least one radio bearer, and wherein the at least one piece of the first identification information comprises at least one of: a radio bearer identifier, a PDCP layer identifier, a radio link control (RLC) layer identifier, or a logical channel identifier.

18. The multicast transmission method according to claim 15, wherein the third indication information configures a radio bearer, a PDCP layer, an RLC layer, or a logical channel of the terminal device, and wherein the third indication information comprises an identifier of the first protocol layer of the terminal device.

19. The multicast transmission method according to claim 11, wherein the first protocol layer of the terminal device is configured to perform at least one of processing on the first data packet: reordering, duplicate detection, discarding, transferring to an upper layer, or feeding back for the first data packet.

20. An apparatus, comprising:

one or more processors; and one or more non-transitory computer readable memories coupled to the one or more processors and storing programming to be executed by the one or more processors, the programming including instructions that, when executed by the one or more processors, cause the apparatus to perform:

receiving a first data packet and first indication information, wherein the first indication information indicates a sequence of the first data packet in at least one data packet;

setting a sequence number of a first protocol layer of the first data packet based on the first indication information, wherein the first protocol layer is different from a packet data convergence protocol (PDCP) layer; and sending the first data packet to a terminal device.

21. The apparatus according to claim 20, wherein the sequence number of the first protocol layer is set based on a first sequence number in the first indication information.

* * * * *